(12) United States Patent
Cho et al.

(10) Patent No.: US 9,727,184 B2
(45) Date of Patent: Aug. 8, 2017

(54) IDENTIFYING INPUT IN ELECTRONIC DEVICE

(71) Applicant: Samsung Electronics Co., Ltd., Gyeonggi-do (KR)

(72) Inventors: Chi-Hyun Cho, Gyeonggi-do (KR); Chang-Ryong Heo, Gyeonggi-do (KR); Ken-Hyung Park, Gyeonggi-do (KR); Sae-Rome Kim, Gyeonggi-do (KR); Kyung-Hee Lee, Gyeonggi-do (KR); Kun-Woo Baek, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 36 days.

(21) Appl. No.: 14/571,573

(22) Filed: Dec. 16, 2014

(65) Prior Publication Data

US 2015/0242015 A1   Aug. 27, 2015

(30) Foreign Application Priority Data

Feb. 26, 2014   (KR) ........................ 10-2014-0022641

(51) Int. Cl.
| | | |
|---|---|---|
| *G06F 3/045* | (2006.01) | |
| *G06F 3/044* | (2006.01) | |
| *G06F 3/01* | (2006.01) | |
| *G04G 9/00* | (2006.01) | |
| *G06F 3/041* | (2006.01) | |
| *G06F 3/0488* | (2013.01) | |
| *G06F 3/039* | (2013.01) | |

(52) U.S. Cl.
CPC .......... *G06F 3/044* (2013.01); *G04G 9/0005* (2013.01); *G06F 3/014* (2013.01); *G06F 3/039* (2013.01); *G06F 3/0416* (2013.01); *G06F 3/0488* (2013.01)

(58) Field of Classification Search
None
See application file for complete search history.

(56) References Cited

U.S. PATENT DOCUMENTS

| 8,643,625 B2 * | 2/2014 | Kruglick ................. G06F 3/044 345/1.1 |
|---|---|---|
| 2002/0185999 A1 | 12/2002 | Tajima et al. |
| 2009/0225036 A1 | 9/2009 | Wright |
| 2009/0231960 A1 * | 9/2009 | Hutcheson ............. G04G 17/04 368/10 |

(Continued)

FOREIGN PATENT DOCUMENTS

| EP | 0 762 319 A2 | 3/1997 |
|---|---|---|
| GB | 2 428 094 A | 1/2007 |
| KR | 10-2011-0057501 A | 6/2011 |

OTHER PUBLICATIONS

European Search Report, dated Mar. 16, 2017.

(Continued)

*Primary Examiner* — Jennifer Mehmood
*Assistant Examiner* — Stephen T Reed
(74) *Attorney, Agent, or Firm* — Cha & Reiter, LLC.

(57) ABSTRACT

Disclosed herein are a method and electronic device for handling input. A first electronic device detects input and identified whether the input is associated with a second electronic device based on set information for distinguishing inputs.

23 Claims, 33 Drawing Sheets

(56) References Cited

U.S. PATENT DOCUMENTS

| | | | | |
|---|---|---|---|---|
| 2011/0007035 A1* | 1/2011 | Shai | ............ | G06F 3/014 |
| | | | | 345/179 |
| 2011/0122087 A1 | 5/2011 | Jang et al. | | |
| 2014/0184555 A1* | 7/2014 | Pi | ............ | G08C 17/06 |
| | | | | 345/174 |
| 2014/0273849 A1* | 9/2014 | Lee | ............ | G06F 3/017 |
| | | | | 455/41.2 |
| 2014/0334271 A1* | 11/2014 | Park | ............ | G04G 21/04 |
| | | | | 368/10 |
| 2014/0366123 A1* | 12/2014 | DiBona | ............ | G06Q 10/00 |
| | | | | 726/16 |
| 2015/0208141 A1* | 7/2015 | Kim | ............ | G08C 17/02 |
| | | | | 340/870.07 |

OTHER PUBLICATIONS

Sirin Tekinay and Bijan Jabbari, Handover and Channel Assignment in Mobile Cellular Networks, XP000279121, Nov. 1, 1991, pp. 42-46, vol. 29, No. 11.

* cited by examiner

BASIC CHARACTER INPUT
(E.G., KOREAN OR DOUBLE CONSONANT INPUT)

TRANSFORMED BASIC CHARACTER INPUT
(E.G., FOREIGN LANGUAGE OR SHIFT INPUT)

PARTIAL NOTIFICATION
(E.G., DEVICE CONNECTION...)

IDENTIFYING INPUT IN ELECTRONIC DEVICE

CROSS-REFERENCE TO RELATED APPLICATION(S)

This application claims the benefit under 35 U.S.C. §119(a) of a Korean patent application filed on Feb. 26, 2014 in the Korean Intellectual Property Office and assigned Serial No. 10-2014-0022641, the entire disclosure of which is incorporated by reference herein.

TECHNICAL FIELD

Examples of the present disclosure relates to an electronic device, wearable device and method for operating the electronic device to handle various inputs to the electronic device.

BACKGROUND

Recent electronic devices provide more diverse services and optional functions. To improve the usefulness of such devices and meet different user demands various applications executable in these devices have been developed. As the devices become more diverse, various user interfaces (UIs) are being developed that provide more efficient user interaction with the devices.

One touch input method used by many electronic devices, such as smart phones, tablets, and the like, is a capacitive touch method. The capacitive touch method may be divided into a self-capacitive method and a mutual capacitive method.

The self-capacitive method recognizes a single touch by sensing a capacitance value. The capacitance value may equal the sum of the touch electrode capacitance and a load capacitance caused by a sensed object (e.g., a finger). The mutual capacitive method senses a reduction in mutual capacitance caused by a sensed object, the mutual capacitance being formed between two or more touch electrodes Tx/Rx. The mutual capacitive method is widely used due to its durability and its ability to allow multi-touch input.

However, the capacitive touch method may not be able to distinguish between various input types, because the touch capacitive method only uses a change in capacitance induced by a touching object, e.g., the finger.

SUMMARY

Examples of the present disclosure address the problem and provide an electronic device, wearable device and method for operating the electronic device, by which a touch input type may be distinguished between a user who wears an electronic device, e.g., a wearable device that produces an electric field, and a touch input of a user who does not wear the wearable device. Thus, distinguishing between these input types allows the inputs to be handled separately.

Examples of the present disclosure also provide an electronic device, wearable device and method for operating the electronic device that detects a change in capacity at a point on the touch screen; identifies a touch input that is not associated with a second electronic device, when the change in capacity corresponds to a first range and identifies a touch input that is associated with the second electronic device, when the change in capacity corresponds to a second range. By using these capacity ranges, an electronic device may detect whether the touch input was made by someone wearing a wearable electronic device and may handle each situation accordingly.

Examples of the present disclosure also provide an electronic device, wearable device and method for operating the electronic device, by which user inputs are distinguished and handled separately by controlling the magnitude of an electric field produced by an electronic device (e.g., a wearable device).

Examples of the present disclosure also provide an electronic device, wearable device and method for operating the electronic device, by which user inputs are distinguished and handled separately by controlling the generation pattern of an electric field produced by an electronic device (e.g., a wearable device).

Examples of the present disclosure also provide an electronic device, wearable device and method for operating the electronic device, by which user inputs are distinguished and handled separately by controlling the frequency of an electric field produced by an electronic device (e.g., a wearable device).

In accordance with an aspect of the present disclosure, a method for operating an electronic device is provided. The method may include setting, by a first electronic device, information for distinguishing input types; detecting, by the first electronic device, an input; and identifying, by the first electronic device, whether the input corresponds to an input type associated with the second electronic device, based on the information.

In accordance with another aspect of the present disclosure, a method for operating a first electronic device is provided. The method may include detecting, by a first electronic device, input; identifying, by the first electronic device, a change in capacitance due to the input; identifying, by the first electronic device, a touch input that is not associated with a second electronic device, when the change in capacitance corresponds to a first range; and identifying, by the first electronic device, a touch input that is associated with the second electronic device, when the change in capacitance corresponds to a second range.

In accordance with an aspect of the present disclosure, the electronic device is provided. The electronic device may include a touch screen; a touch screen controller to: detect a change in capacity at a point on the touch screen; identify a touch input that is not associated with a second electronic device, when the change in capacity corresponds to a first range; and identify a touch input that is associated with the second electronic device, when the change in capacity corresponds to a second range.

In accordance with an aspect of the present disclosure, a wearable device is provided. The wearable device may include a communication unit to receive settings from an electronic device; a signal generator to generate a signal based on the settings; and an electrode to detect bodily contact with the wearable device and produce an electric field from the signal generated by the signal generator.

BRIEF DESCRIPTION OF THE DRAWINGS

The above and other features and advantages of the present disclosure will become more apparent in the following description of examples with reference to the attached drawings in which.

Throughout the drawings, like reference numerals will be understood to refer to like parts, components, and structures.

DETAILED DESCRIPTION

Figure 1:
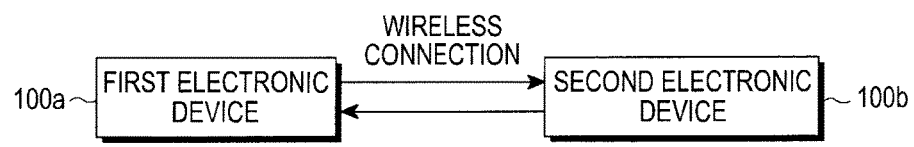
FIG. 1 is a schematic diagram of an example system in accordance with aspects of the present disclosure.

Examples of the disclosure will be described with reference to the accompanying drawings, in which illustrative examples of the disclosure are shown. The examples may, however, be implemented in many different forms and should not be construed as being limited to the examples set forth herein; rather, these examples are provided for purposes of thoroughness and completeness of the disclosure, and to convey the techniques to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the examples of the present disclosure. Descriptions shall be understood as to include any and all combinations of one or more of the associated listed items when the items are described by using the conjunctive term "~ and/or ~," or the like.

The terminology used herein is for the purpose of describing particular examples only and is not intended to be limited to the examples of the present disclosure. As used herein, the singular forms "a", "an" and "the" are intended to include the plural forms as well, unless the context clearly indicates otherwise. It will be further understood that the terms "comprises" and/or "comprising," when used in examples of the present disclosure, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Examples of the present disclosure provide an electronic device and method for distinguishing and separately handling input made by users who do and do not wear an electronic device.

For example, when a user wearing a second electronic device that generates an electric field comes into contact with a first electronic device (or a touch pad of the first electronic device) with part of his/her body (e.g., a finger), the first electronic device may identify whether the contact is made while wearing a second electronic device. In this regard, various user environments may be provided.

Examples of the present disclosure also provide an electronic device and method for operating the electronic device that distinguishes and separately handles input types. An example of an input type associated with a second electronic device may include an input made with a hand wearing a second electronic device. Another example of an input type is an input made with a hand without wearing such a device.

By way of example, when the user comes into contact with a first electronic device (or a touch pad of the first electronic device) with his/her hand wearing a second device (e.g., the left hand) that generates an electric field, the first electronic device may distinguish the contact from a contact of the user with the hand not wearing the second electronic device (e.g., the right hand) or from that of the user not wearing the second electronic device, and handle the distinguished contact. Thus, by distinguishing between different electrical fields, the first electronic device may identify input that is associated with the second electronic device and identify input that is not associated with the second electronic device.

Examples of the present disclosure also provide an electronic device and method for operating the electronic device, by which user inputs may be distinguished and handled separately by controlling the magnitude, pattern, or frequency of an electric field generated by an electronic device (e.g., a wearable device).

By way of further example, when the user wearing a second electronic device that generates an electric field with a predefined magnitude, pattern, or frequency or predefined by a first electronic device comes into contact with the first electronic device (or a touch pad of the first electronic device), the first electronic device may distinguish the contact based on a change in capacitance at the touch pad and handle the distinguished contact. Thus, by distinguishing between changes in capacitance, the first electronic device may distinguish between an input that is associated with the second electronic device and an input or that is not associated with the second electronic device.

In the following examples, the electronic device may be any device that includes at least one processor and optionally, a camera, a portable terminal, a mobile terminal, a communication terminal, a portable communication terminal, a portable mobile terminal, etc. For example, the electronic device may be a digital camera, a smartphone, a cell phone, a game console, a television, a display device, a head unit for vehicle, a notebook computer, a laptop computer, a tablet computer, a Personal Media Player (PMP), a Personal Digital Assistant (PDA), a GPS, an Automatic Teller Machine (ATM) for banks, a Point Of Sale (POS) for shops, etc. In various examples, the electronic device may be a flexible device or a flexible display device. The electronic device may also be a wearable device (e.g., a watch like device, a glass like device, a cloth like device, etc.)

Examples of the present disclosure will now be described with reference to accompanying drawings.

Figure 2:
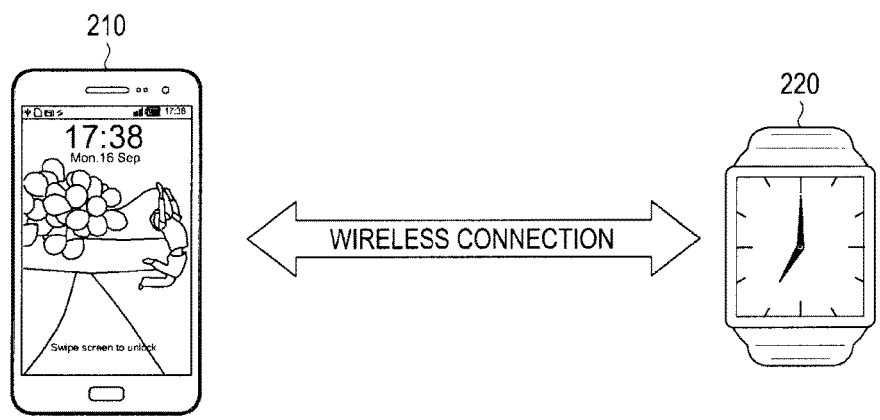
FIG. 2 illustrates example communication between devices in accordance with aspects of the present disclosure.
Figure 3:
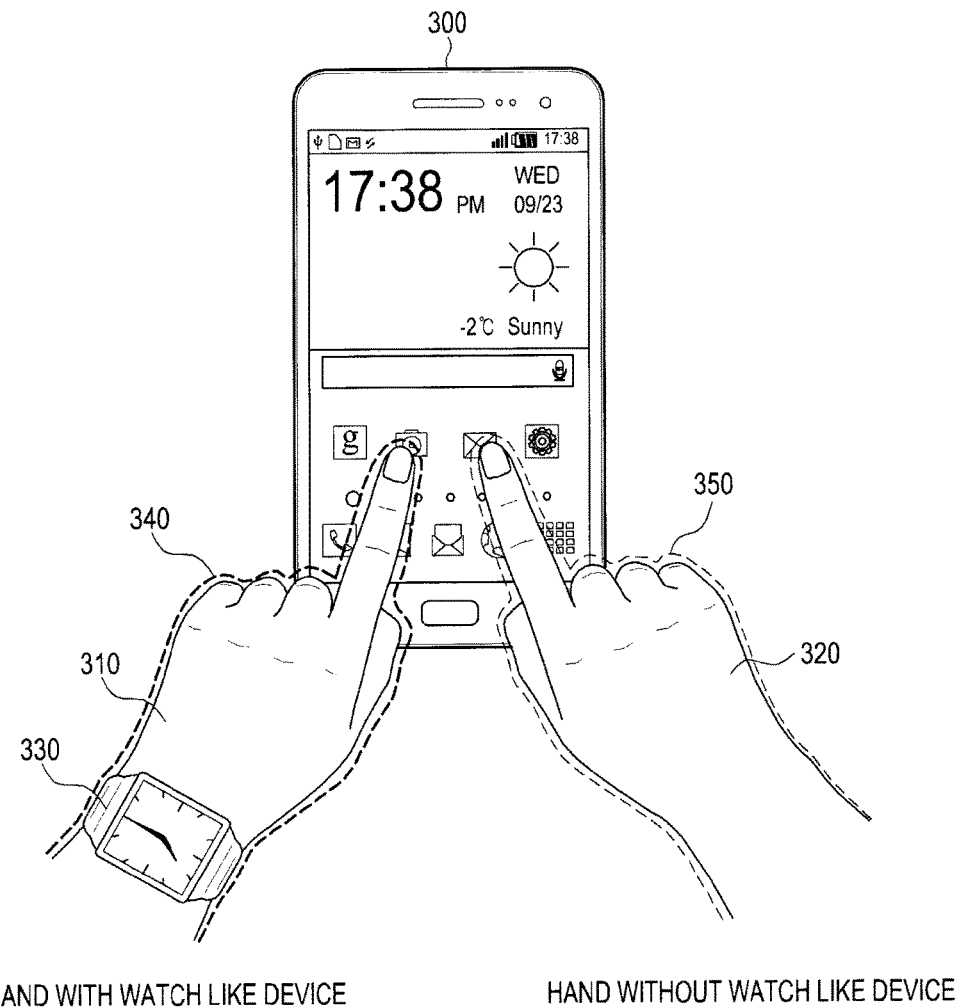
FIG. 3 is a working example of an electric field induced by hands with and without a wearable device in accordance with aspects of the present disclosure.
Figure 4:
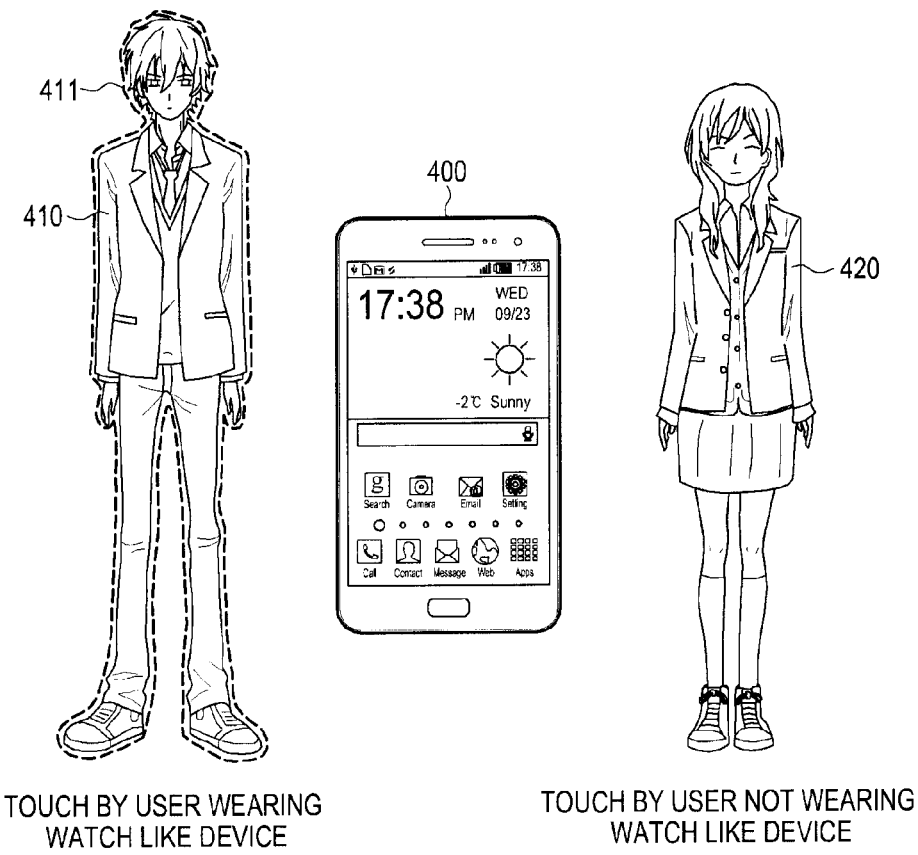
FIG. 4 is a working example of an electric field induced by people wearing and not wearing a wearable device in accordance with aspects of the present disclosure.

In FIG. 1, a structure of an example system is illustrated. FIGS. 2-4 illustrate example methods for handling input in accordance with aspects of the present disclosure.

FIG. 1 is a schematic diagram of an example system. A first electronic device 100a and a second electronic device 100b may exchange information. The first electronic device 100a may be a portable electronic device, such as a smart phone, and the second electronic device 100b may be a wearable device, such as a watch like device or a device embedded in a pair of glasses. However, examples of the present disclosure are not limited to these examples.

Furthermore, although the first electronic device 100a and the second electronic device 100b are shown to be in communication with each other, other examples may preclude them from being in communication. For example, functions may be provided only by the user making contact with a touch pad of the first electronic device 100a while the user is in contact with the second electronic device 100b (e.g., while the user wears the second electronic device 100b).

More specifically, the first electronic device 100a and the second electronic device 100b may be connected via a communication network. For example, the communication network may be any wired or wireless communication network, including e.g., a Personal Area Network (PAN), Local Area Network (LAN), a Metropolitan Area Network (MAN), a Wide Area Network (WAN), etc. The communication network may also be a well-known World Wide Web (WWW), and may use wireless communication technologies for short range communication, such as Infrared Data Association (IrDA) or Bluetooth. In addition, the communication network may include a cable broadcasting network, a terrestrial broadcasting network, a satellite broadcasting network, etc.

If the first electronic device 100a and the second electronic device 100b are in close distance, the short range communication (e.g., Bluetooth communication) may be used to establish communication between them. If the first electronic device 100a and the second electronic device 100b are connected wirelessly, the examples described below may be implemented between the two devices while they are in a paired state.

Working examples for handling input will be described with reference to FIGS. 2 to 4. FIG. 2 illustrates an example communication between devices. A smart phone 210 may correspond to the first electronic device 100a of FIG. 1 and a watch like device 220 may correspond to the second electronic device 100b of FIG. 1. In one example, the smart phone 210 may send the watch like device 220 information for electric field generation. The watch like device 220 may generate an electric field with a certain magnitude, pattern, or frequency based on the information or settings received from the smart phone 210.

By way of example, if the user wearing watch like device 220 touches the touch panel (e.g., touch screen) of smart phone 210, smart phone 210 may determine based on an electric field generated by the watch like device 220 that the user is wearing the watch like device 220. With this method, the smart phone 210 may identify users and identify which hand wears the watch like device 220, which will be discussed later in detail.

For ease of illustration, in the following examples, smart phone 210 will be taken as an example of the first electronic device 100a and the watch like device 220 as an example of the second electronic device 100b, as shown in FIG. 2. However, it is understood that other devices may be used.

FIG. 3 is a working example of electric fields induced by a hand wearing a wearable device and a hand not wearing a wearable device. Referring to FIG. 3, the touch screen of a smart phone 300 is shown to be touched by a user who wears a watch like device 330. In one example, the watch like device 330 may generate an electric field with a predetermined magnitude or pattern or frequency. Accordingly, when the user wearing the watch like device 330 touches the touch screen of the smart phone 300, the touch may be distinguished from a touch made when the user does not wear the watch like device 330. By distinguishing user inputs, various functions as described below with reference to FIGS. 27 to 43 may be provided.

Furthermore, as shown in FIG. 3, while the user wears the watch like device 330, the smart phone 300 may distinguish a touch made by one hand 310 wearing the watch like device 330 from a touch made by the other hand 320 not wearing the watch like device 330. More specifically, when an electric field is generated by the watch like device 330, a magnitude of the electric field transmitted to the smart phone 300 from a hand that does not wear the watch like device 330 is relatively small compared with a magnitude of the electric field transmitted to the smart phone 300 from a hand that wears the watch like device 330. Thus, by detecting the difference between the transmitted electric fields in a touch screen controller of the smart phone 300, the smart phone 300 may identify whether the touch is made by a hand wearing the watch like device 330 or a hand not wearing the watch like device 330.

Referring to FIG. 3, where the user wears the watch like device 330 on his/her left hand 310, the magnitude of an electric field 340 transmitted from the left hand 310 may be greater than the magnitude of an electric field 350 transmitted from the right hand 320 not wearing the watch like device 330. Accordingly, the smart phone 300 may distinguish the left hand 310 touching the touch screen of the smart phone 300 from the right hand 320 touching the touch screen, and thus provide various user input functions as shown in FIGS. 27 to 43 using the input discrimination.

FIG. 4 is a working example of an electric field induced by people wearing and not wearing a wearable device. Referring to FIG. 4, when a man 410 wearing a wearable device (e.g., a watch like device) makes contact with a smart phone 400 on a part of his body, an electric field 411 generated by the wearable device may be used to identify that the wearable device is worn by the man 410. For example, since a change in capacitance generated from a touch input of the man 410 wearing the watch like device may be different from a change in capacitance generated from a touch input of a woman 420 not wearing the watch like device, the difference in capacitance change may be used to identify whether a person who touches the touch screen of the smart phone 400 wears the watch like device. A magnitude, a pattern, or a frequency of an electric field generated by each watch like device may also be used to identify or authenticate a user.

Thus, by distinguishing the capacitance sensed at the touch pad of smart phone 400 based on whether the wearable device is worn, left and right hand inputs may be distinguished as shown in FIG. 3 and an input of a user who wears the wearable device and an input of a user who does not wear the wearable device may be distinguished as shown in FIG. 4.

While the examples of FIGS. 3 and 4 show users wearing the wearable device (e.g., the watch like device), in other examples, the wearable device need not be worn but may just come into contact with the body of the user to generate an electric field transmitted to the smart phone 300 or 400.

Furthermore, while the examples of FIGS. 3 and 4 illustrate a user touching smart phone 300 or 400 with a finger while wearing the wearable device, it is understood that any other body part may be used to touch smart phone 300 or 400.

In addition, while the examples of FIGS. 3 and 4 illustrate a user touching the touch screen of smart phone 300 or 400 with a finger while wearing the wearable device, it is understood that any other part of smart phone 300 or 400 that may detect an electric field may be touched by the user.

Examples of a method for generating an electric field in a wearable device (e.g., a watch like device) will be described below in detail with reference to FIGS. 5 to 7.

Figure 5:
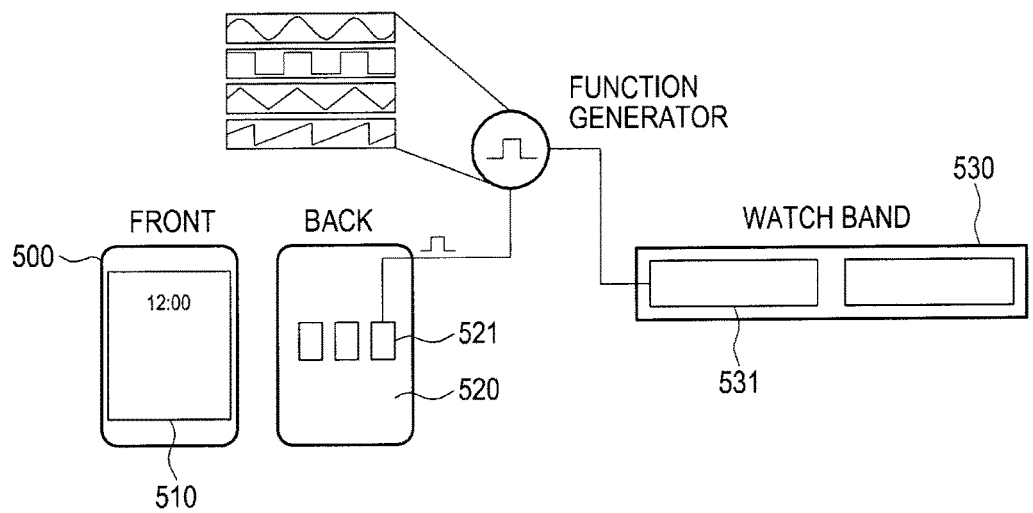
FIG. 5 is a working example of generating an electric field from a wearable device in accordance with aspects of the present disclosure.

FIG. 5 illustrates a working example of generating an electric field from a wearable device. The wearable device may include a main unit 500 and a band unit 530. The main unit 500 may include a touch screen on the front 510 and at least one electrode 521 on the back 520. The main unit 500 may include a function generator for generating wave signals, such as sine waves, square waves, etc., which may be electrically connected to at least one electrode 521 on the back 520 (which may come into contact with a human body) of the main unit 500 or at least one electrode 531 formed in the band unit 530.

In another example, an electric field may be produced through the function generator included in the electronic device (e.g., the wearable device) and may be radiated from the electrode formed on the back or in the band unit of the wearable device.

For example, as shown in FIG. 5, electric fields in various forms generated by the function generator of the watch like device may be provided to the at least one electrode formed on the back of the watch like device, and may be transmitted into the user's body through the electrode when the user wears the watch like device. Alternatively, electric fields in various forms generated by the function generator of the watch like device may be provided to the at least one electrode formed in the band unit of the watch like device (e.g., on the surface that comes into contact with the user's body), and may be transmitted into the user's body through the electrode when the user wears the watch like device.

Figure 6:
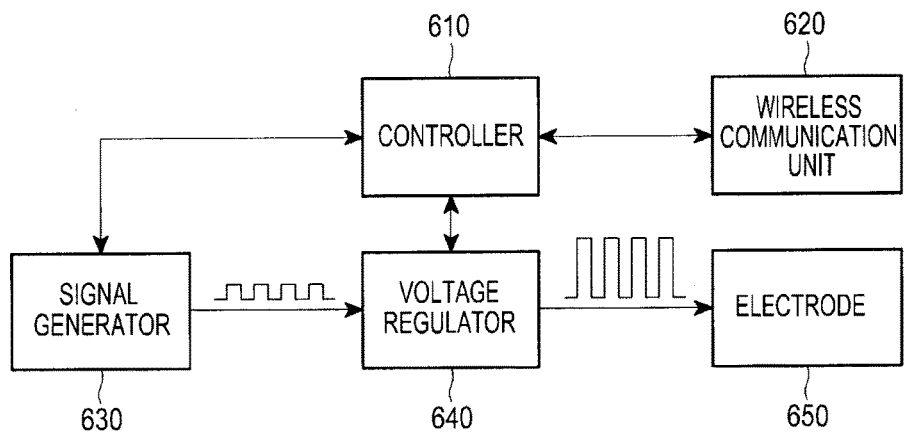
FIG. 6 illustrates a block diagram of an example wearable device in accordance with aspects of the present disclosure.
Figure 7:
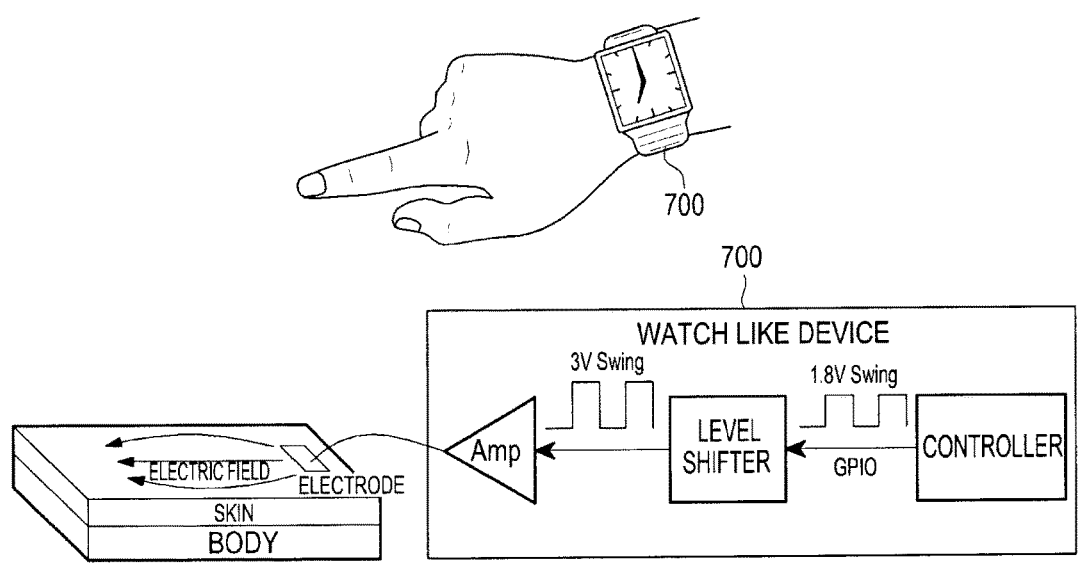
FIG. 7 is a working example of generating a signal in a watch like device in accordance with aspects of the present disclosure.

FIG. 6 is a block diagram of an example function generator and FIG. 7 is a working example of signals being generated in a watch like wearable device 700. Referring to FIG. 6, a function generator included in the watch like wearable device 700 may include a signal generator 630, a voltage regulator 640, and at least one electrode 650. The signal generator 630 may generate and output a predetermined pattern of waves, and may be a Central Processing Unit (CPU) or Micro Controller Unit (MCU), for example. The signal generator 630 may utilize controllable signals, such as General Purpose Input/Output (GPIO) outputs, or a clock source, such as a crystal (XTAL) generator. Further, circuits, such as an amplifier, a level shifter, and the like may be added to control the cycle or amplitude of signals.

The voltage regulator 640 may use such level shifter to increase the magnitude of waves output from the signal generator 630 to a predetermined level and provide the enhanced waves to electrode 650. The voltage regulator 640 may adjust a level amplification size under control of the controller 610 (e.g., an application processor (AP)).

The controller 610 may also exchange control signals with the signal generator 630 and communicate with the first electronic device (e.g., the smart phone) through a wireless communication unit 620, thus receiving information about a magnitude, pattern or frequency of an output signal for generating an electric field from the first electronic device. As such, controller 610 may provide control signals for the signal generator 630 or the voltage regulator 640 using information received from the first electronic device, so that a signal with a desired magnitude, pattern, or frequency for a desired electric field may be generated and provided to the electrode.

Since the second electronic device (e.g., a wearable device) is connected (e.g., paired) with the first electronic device (e.g., a smart phone), the controller 610 of the second electronic device may send a request for information regarding a desired electric field to the first electronic device through the wireless communication unit 620. The controller 610 of the second electronic device may control the signal generator 630 or control the voltage regulator 640 based on the information received from the first electronic device to adjust a magnitude, pattern, or frequency of an electric field to be generated.

Referring now to FIG. 7, the controller 610 may generate a desired frequency signal through output voltage swing. The controller 610 may also adjust the magnitude of an output voltage by controlling the level shifter and the amplifier. In this regard, the level shifter is responsible for increasing the magnitude of the signal generated by the controller 610, and the amplifier may be optionally configured if a voltage higher than the voltage provided by the level shifter is required.

The resultant signal may be delivered to the electrode, and if the user wears the wearable device and comes into contact with the electrode, an electric field is produced through the skin of the user.

Figure 8:
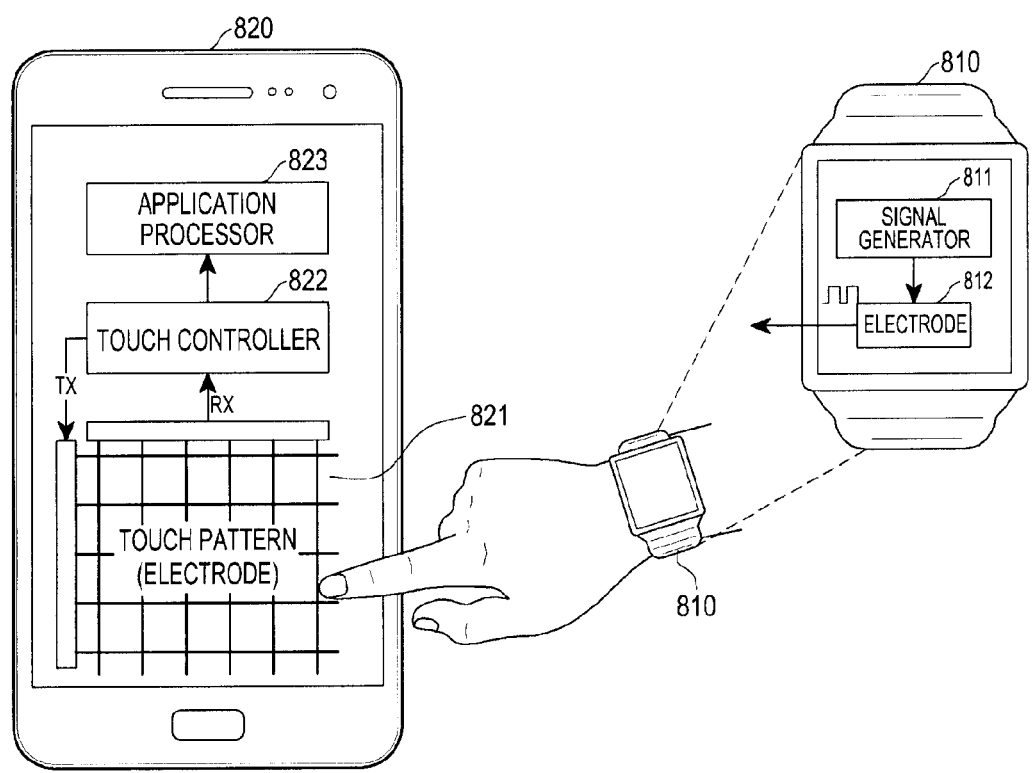
FIG. 8, FIG. 9, FIG. 10 and FIG. 11 are working examples of a capacitive touch input method in accordance with aspects of the present disclosure.
Figure 9:
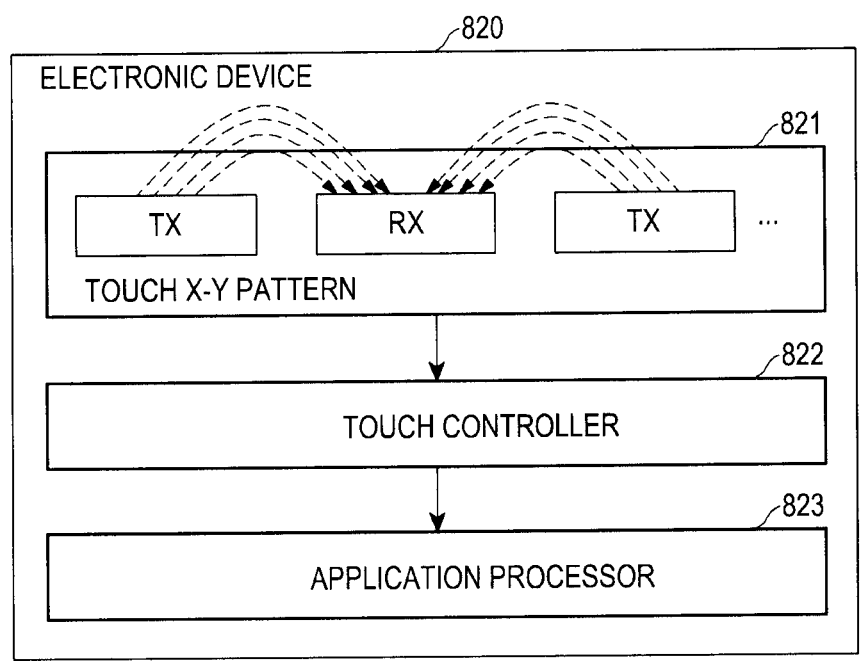

FIGS. 8 to 11 illustrate is a working example of a capacitive touch input method. Referring to FIGS. 8 and 9, a touch pattern 821 formed in the touch screen of the electronic device 820 is in an X-Y pattern, in which transmitters TXs and receivers Rxs are arranged in a lattice pattern. Electrical coupling occurs between the TXs and RXs. When a touch is made by the user on the touch pattern 821, a touch controller 822 of the electronic device 820 detects a change in the electrical coupling of the touch pattern 821 (for example, an amount of reduced capacitance), calculates x-y coordinates of the position the user has touched, converts the calculated x-y coordinates to a digital signal, and sends the digital signal to an Application Processor (AP) 823. Having received the digital signal from the touch controller 822, the AP may handle an input that corresponds to the touch in the application.

Figure 10:
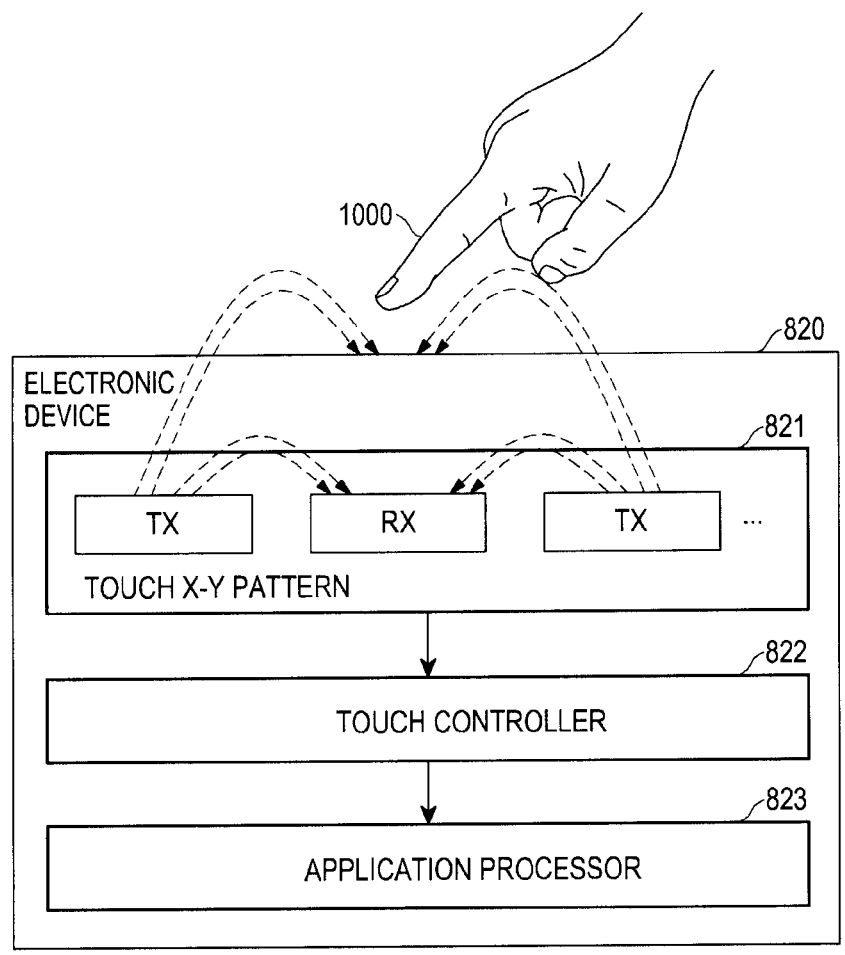

For example, as shown in FIG. 10, if a finger 1000 of a user touches the touch pad of the electronic device 820, an electric field produced around the finger may cause a change in electrical coupling (e.g., a change in capacitance) on the touch pattern 821. The touch controller 822 may recognize the touch by detecting a change in the coupling, as described above.

Figure 11:
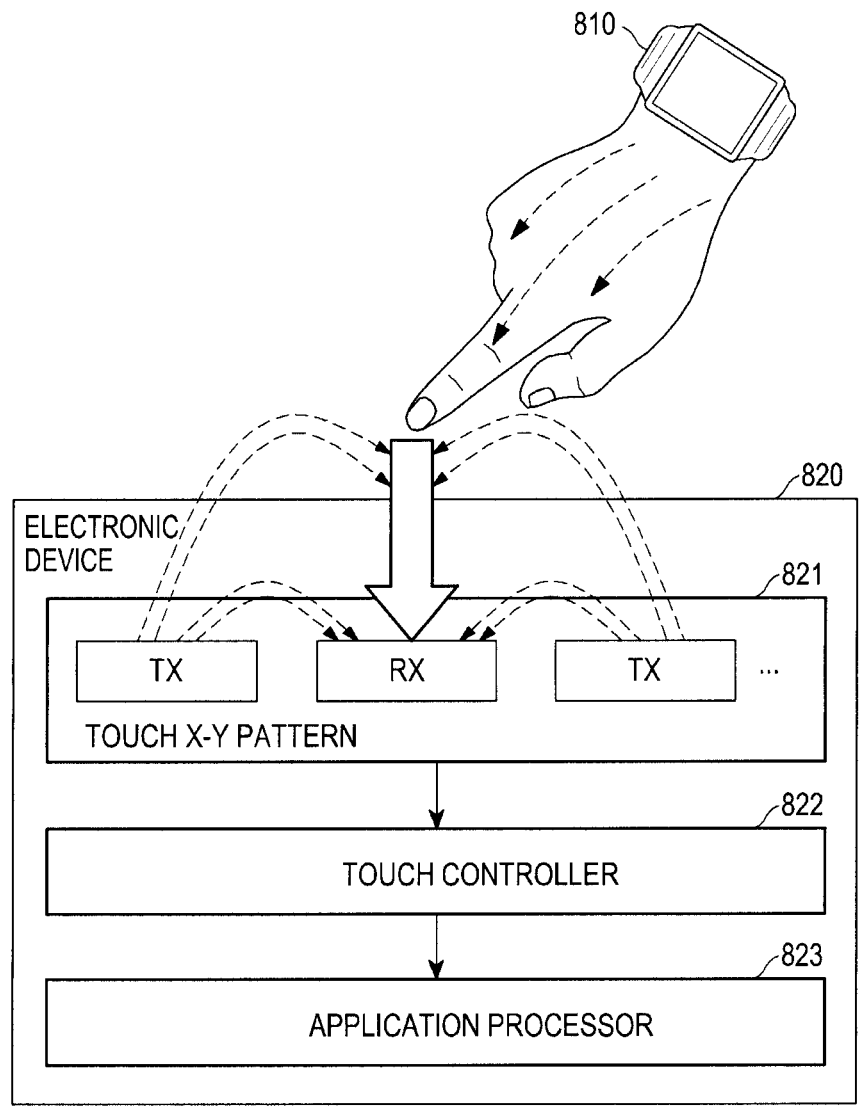

On the other hand, as shown in FIG. 11, when a user wears a watch like device 810 and touches the touch pad, a change in the electrical coupling on the touch pad may appear differently than that produced when the user does not wear the watch like device 810 and touches the touch pad. For example, as shown in FIG. 10, when a user not wearing the device touches the screen, an electric field (E-field) produced by a signal driven in the TX electrode pattern of the electronic device 820 may be sensed in the RX electrode pattern. However, as shown in FIG. 11, when the user wearing the watch like device 810 touches the screen, an electric field induced from the watch like device 810 may be additionally sensed in the RX electrode pattern.

Figure 12:
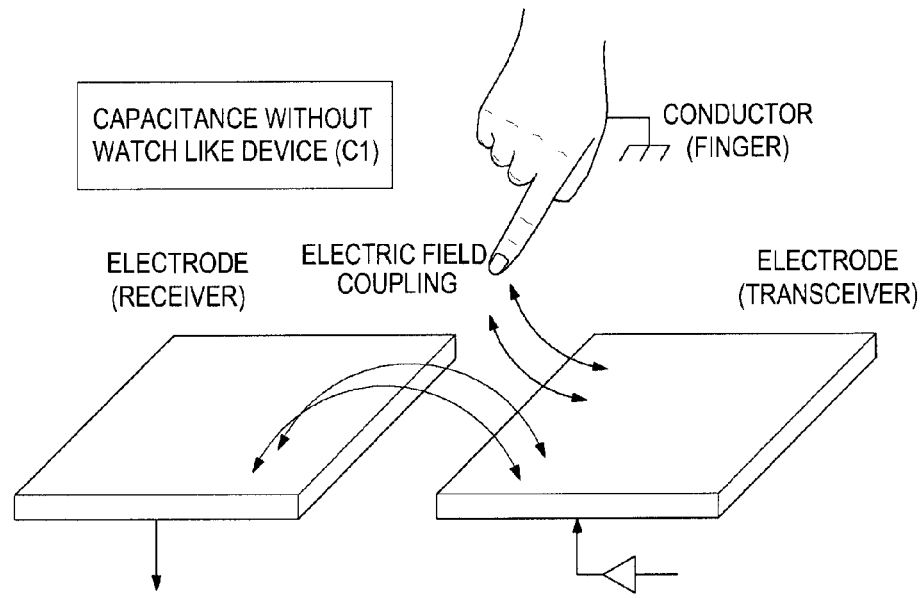
FIG. 12 and FIG. 13 are working examples of changes in capacitance based on whether a wearable device is worn.
Figure 13:
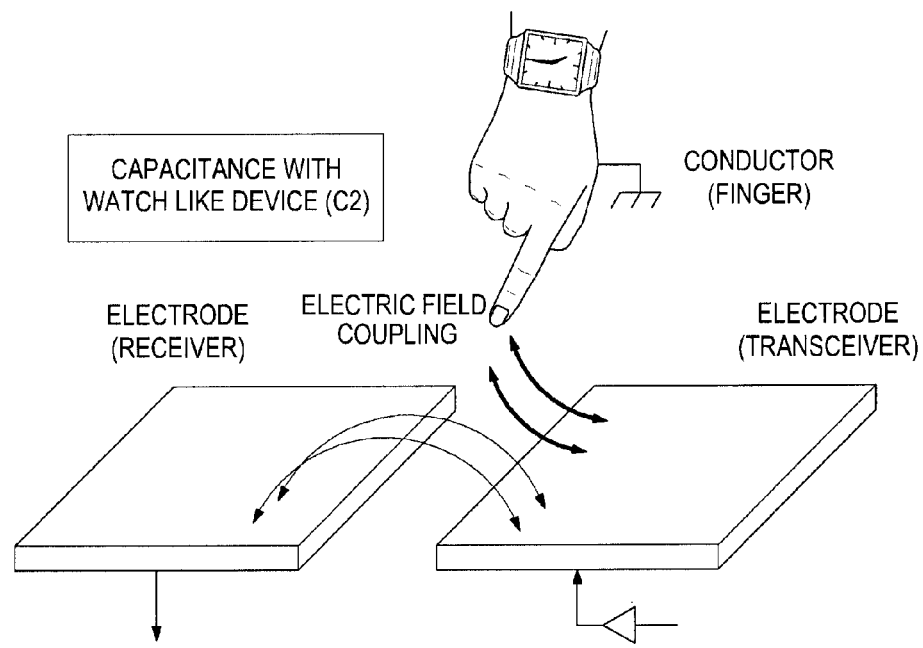

FIGS. 12 and 13 are working examples of changes in capacitance based on whether a wearable device is worn. Referring to FIGS. 12 and 13, the user's finger may serve as a conductor. Accordingly, when the user touches a touch panel with the finger, electrical coupling may occur. In this regard, touches made with the watch like device and without the watch like device cause different changes in coupling, as shown in a graph of FIG. 14.

Figure 14:
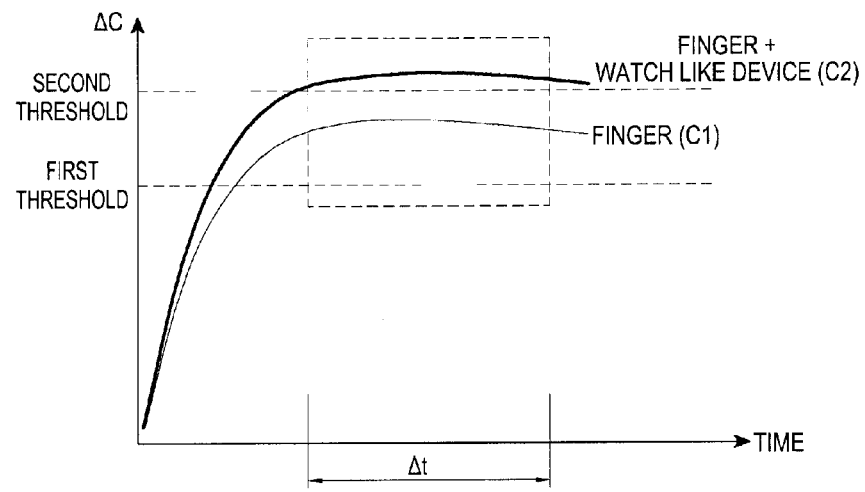
FIG. 14 is a graph representing example thresholds for occasions of wearing and not wearing a wearable device.

For example, referring to FIG. 14, a touch made with the watch like device causes a change in capacitance ΔC at the touch panel, which is measured as C1, and a touch made without the watch like device causes a change in capacitance ΔC at the touch panel, which is measured as C2. As such, the difference in the capacitance change may distinguish whether the touching hand is wearing the watch like device.

FIG. 14 is a graph representing example thresholds for occasions of wearing and not wearing a wearable device. Referring to FIG. 14, two or more touch thresholds may be set for the first electronic device (e.g., a smart phone) to distinguish touch inputs.

Accordingly, determining whether a sensed capacitance change exceeds a first threshold enables recognition of whether a touch is made on the touch panel. Furthermore, determining whether the capacitance change exceeds a second threshold enables identification of whether the touch is made with or without the watch like device.

Figure 15:
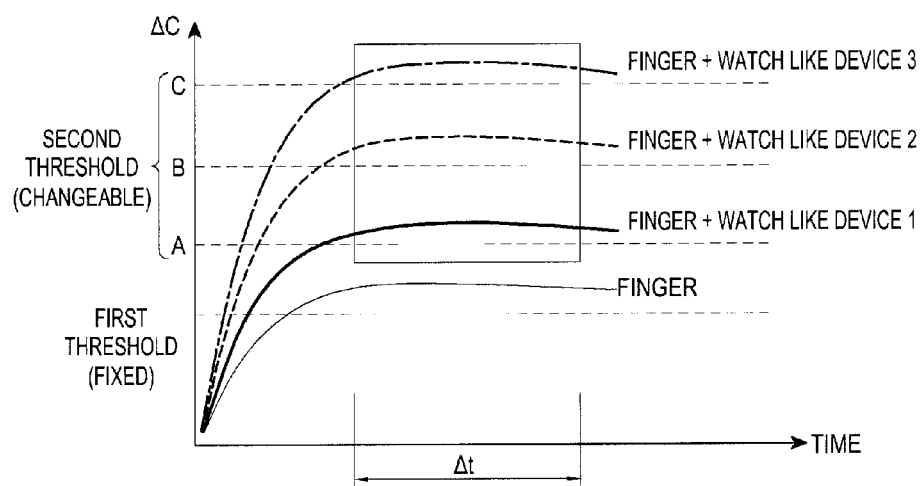
FIG. 15 is a graph representing example thresholds to identify occasions of wearing different wearable devices.

FIG. 15 is a graph representing example capacitance thresholds settings to identify multiple wearable devices. Referring to FIG. 15, whether a touch is made on a touch panel may be determined based on a fixed first threshold. For example, when the user makes a touch with his/her finger without wearing the watch like device, a capacitance change ΔC at the touch pad is greater than the first threshold and thus the touch may be recognized. However, the capacitance change ΔC is less than a second threshold, and thus it is determined that the user does not wear the watch like device.

In a further example, the second threshold different from the first threshold may be used to determine whether the user wears the watch like device. For example, when the user makes a touch with his/her finger while wearing the watch like device, a capacitance change ΔC at the touch pad is greater than the first threshold and thus the touch may be recognized. Further, the capacitance change ΔC is greater than the second threshold, and thus it is determined that the user wearing the watch like device made the touch.

Varying the second threshold enables identification of device types of a wearable device worn by the user and of the position (e.g., left hand or right hand) in which the wearable device is worn. Furthermore, even for the same wearable device or the same type of wearable device, varying the magnitude, pattern or frequency of the electric field produced by the wearable device enables identification of the wearable device worn by the user or identification of the user.

Figure 16:
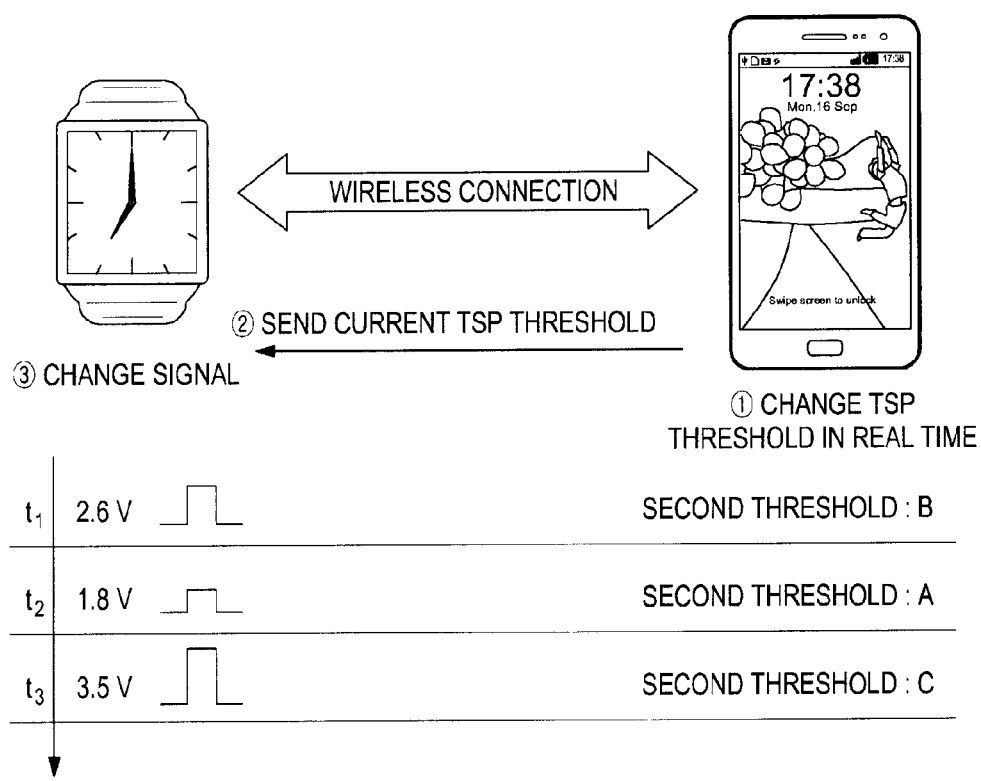
FIG. 16 is a working example of changes in signal strength with changes in thresholds in accordance with aspects of the present disclosure.
Figure 17:
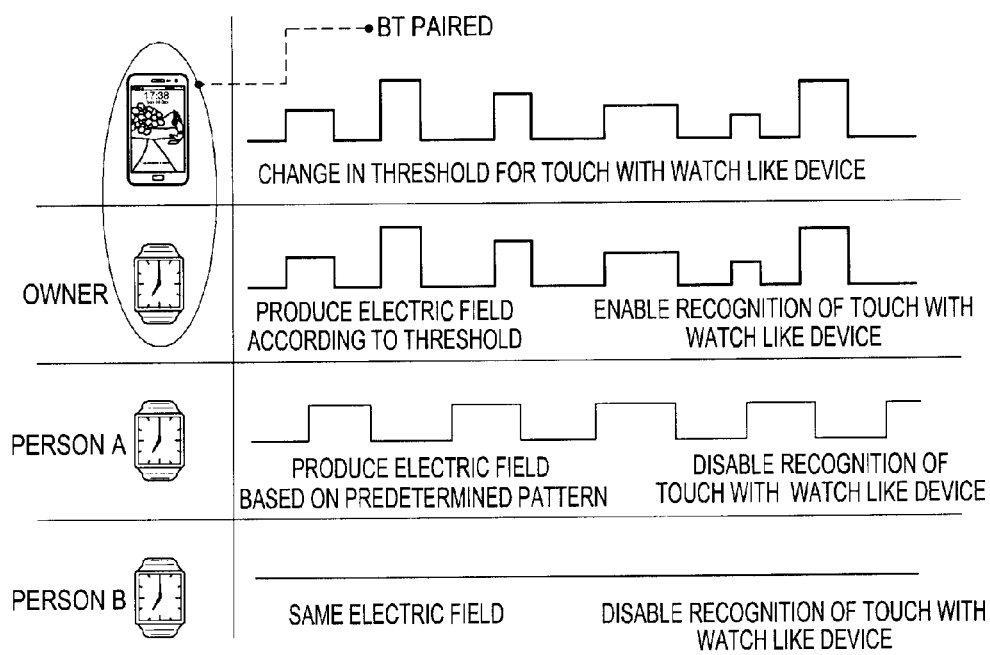
FIG. 17 is a working example of how to identify users in accordance with threshold changes.
Figure 18:
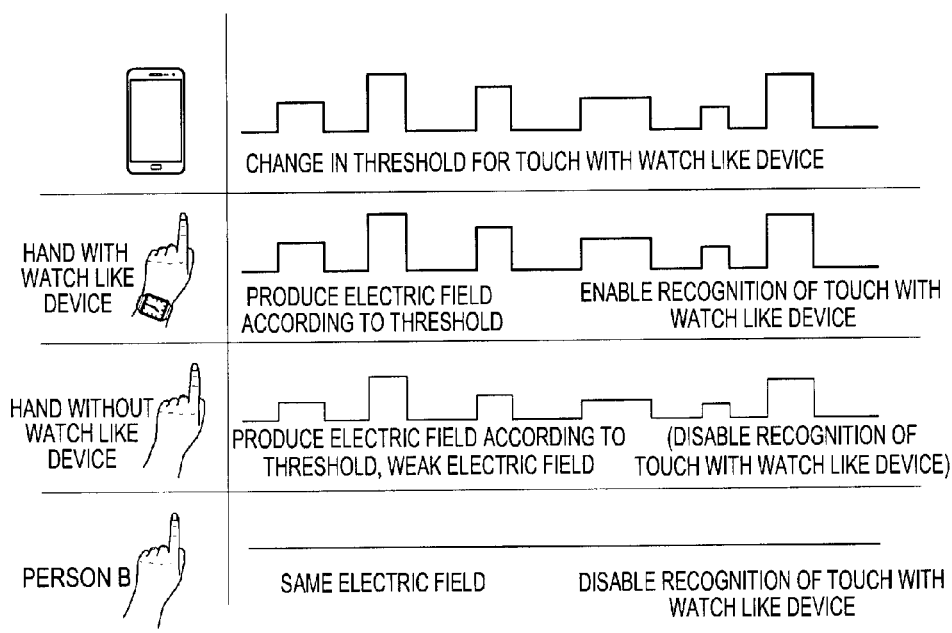
FIG. 18 is a working example of how to identify users and their hands with or without a wearable device in accordance with threshold changes.

For example, FIGS. 16 to 18 illustrate that a second threshold may be changed in real time to distinguish touch inputs with and without the wearable device. For example, referring to FIG. 16, the smart phone may change the second threshold in real time and send information about the change to the wearable device through wireless communication.

The wearable device may then adjust the strength of the electric field produced by the signal generator based on the information, as described above.

For example, as shown in FIG. 16, if the smart phone sets the second threshold to be 'B' at time t1 and sends information about it to the wearable device, then the signal generator of the wearable device may generate a signal (e.g., a 2.6V signal) corresponding to the second threshold 'B' after the time t1. If the smart phone sets the second threshold to be 'A' at time t2 and sends information about it to the wearable device, then the signal generator of the wearable device may generate a signal (e.g., a 1.8V signal) corresponding to the second threshold 'A' after the time t2. Furthermore, if the smart phone sets the second threshold to be 'C' at time t3 and sends information about it to the wearable device, then the signal generator of the wearable device may generate a signal (e.g., a 3.5V signal) corresponding to the second threshold 'C' after the time t3.

Accordingly, if a user wears the wearable device and touches the smart phone, the smart phone may detect a change in capacitance with the electric field produced from the signal generated as described above, and authenticate the wearable device or determine whether the touch is made, by applying the corresponding threshold.

FIG. 17 is a working example of identifying users in accordance with threshold changes. Referring to FIG. 17, a smart phone and a watch like device are paired through wireless communication (e.g., Bluetooth), and the smart phone may send a magnitude, pattern, or frequency of a signal to be generated to the watch like device and accordingly, recognize a touch made by a user wearing the watch like device. Accordingly, for example, where the smart phone and the watch like device are paired, the smart phone may determine that a user who wears the watch like device is the owner of the smart phone. By doing this, user inputs may be distinguished and handled separately by detecting a touch made by the user who wears the watch like device.

For example, if the smart phone owner's watch like device is paired with the smart phone, the watch like device may produce an electric field based on information received from the smart phone and then the smart phone may authenticate the owner's watch like device by sensing a capacitance change due to the electric field. Accordingly, the smart phone may recognize a touch made with the watch like device and handle the touch.

In another example, if a person A touches the smart phone while wearing his/her watch like device that produces a different pattern of electric field, the smart phone may not recognize it and may not perform any input process for the touch or perform a different mode operation.

In yet another example, if a person B touches the smart phone while wearing his/her watch like device that does not creates any electric field, the smart phone may not recognize it and may not perform any input process for the touch or perform a different mode operation.

For example, turning back to FIG. 17, when a person wearing a device paired with a smart phone touches the smart phone, the wearable device paired with the smart phone may receive information about a threshold from the smart phone through wireless communication and produce an electric field based on the information. Accordingly, it may be possible to identify whether the wearable device is worn. On the other hand, if a user wearing a device not paired with the smart phone touches the smart phone, the smart phone may recognize the touch without acknowledging that the user is wearing the device, because the wearable device is not aware of a predetermined threshold and is thus unable to produce an electric field in accordance with the predetermined threshold.

FIG. 18 is a working of example of electric field detection and of identifying users with or without a wearable device. Referring to FIG. 18, touches made by a hand wearing a wearable device may be identified by using the difference in electric fields produced by hands wearing and not wearing the wearable device.

For example, a hand wearing the wearable device has a relatively strong electric field as compared with a hand not wearing the wearable device. Thus, the electric field produced by the hand wearing the wearable device may be greater than a predefined threshold. In contrast, the electric field produced by the hand not wearing the wearable device may be weaker than the predefined threshold because the electric field becomes weak due to resistance from the human body. Accordingly, touch inputs of hands with or without a wearable device may be distinguished with the difference in electric field strengths. Furthermore, as shown in FIG. 18, even for the hand without a wearable device, an electric field whose strength is weaker but whose pattern is similar to that of the hand with the wearable device may be produced. Thus, using this feature enables authentication of a person who wears the wearable device as well as distinction between hands with and without the wearable device, thereby providing various functions.

In the following, a procedure of performing the methods in accordance with examples of the present disclosure will be described with reference to FIGS. 19 and 20.

Figure 19:
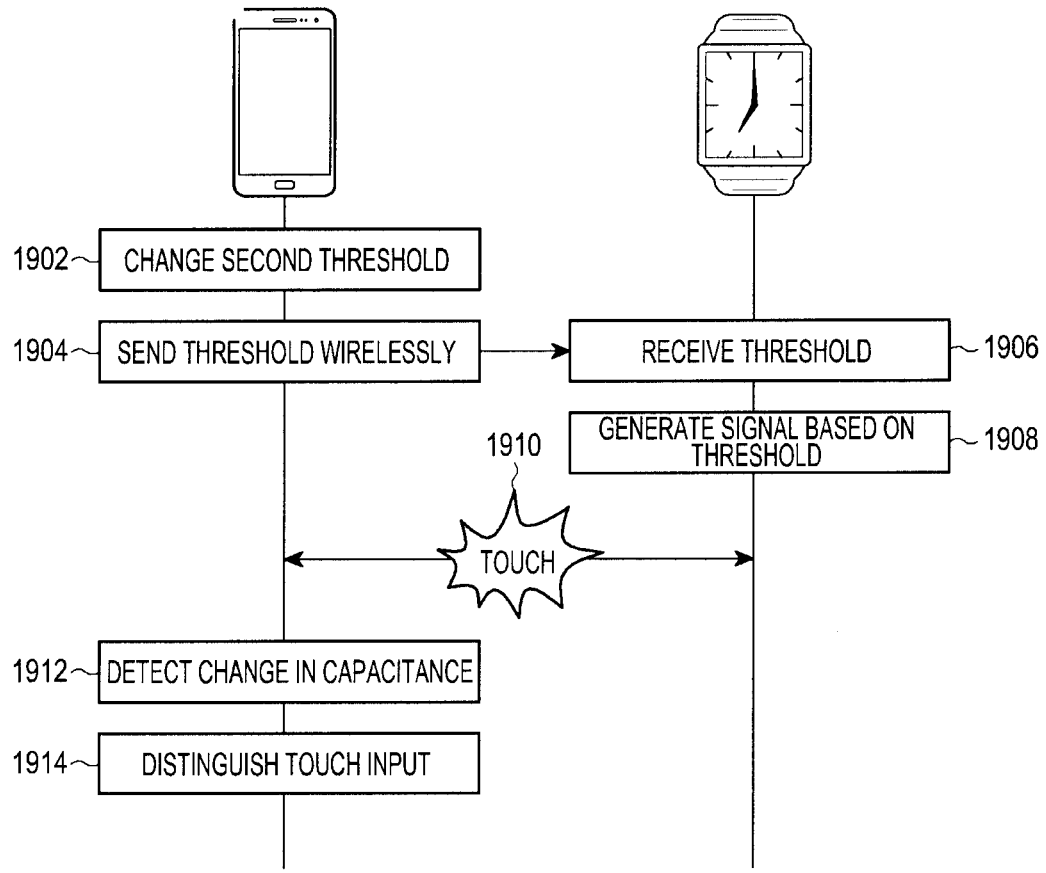
FIG. 19 is a flowchart illustrating an example method in accordance with aspects of the present disclosure.

FIG. 19 is a flowchart illustrating an example input handling method in accordance with aspects of the present disclosure. Referring to FIG. 19, a first electronic device (e.g., a smart phone) may change a second threshold in operation 1902, and send the changed threshold to a second electronic device (e.g., a watch like device) via a wireless communication network in operation 1904.

Upon reception of the second threshold in operation 1906, the second electronic device may generate a signal based on the second threshold as described above, in operation 1908. If a user wearing the second electronic device touches the touch panel of the first electronic device in operation 1910, the first electronic device may sense a change in capacitance on the touch panel of the first electronic device from the electric field produced from the signal generated by the second electronic device, in operation 1912. Accordingly, the first electronic device may distinguish touch inputs (e.g., whether the second electronic device is worn or not, or whether the touch is made by a hand with the second electronic device or a hand without the second electronic device) and handle the touch input based on the sensed change in capacitance, in operation 1914.

Figure 20:
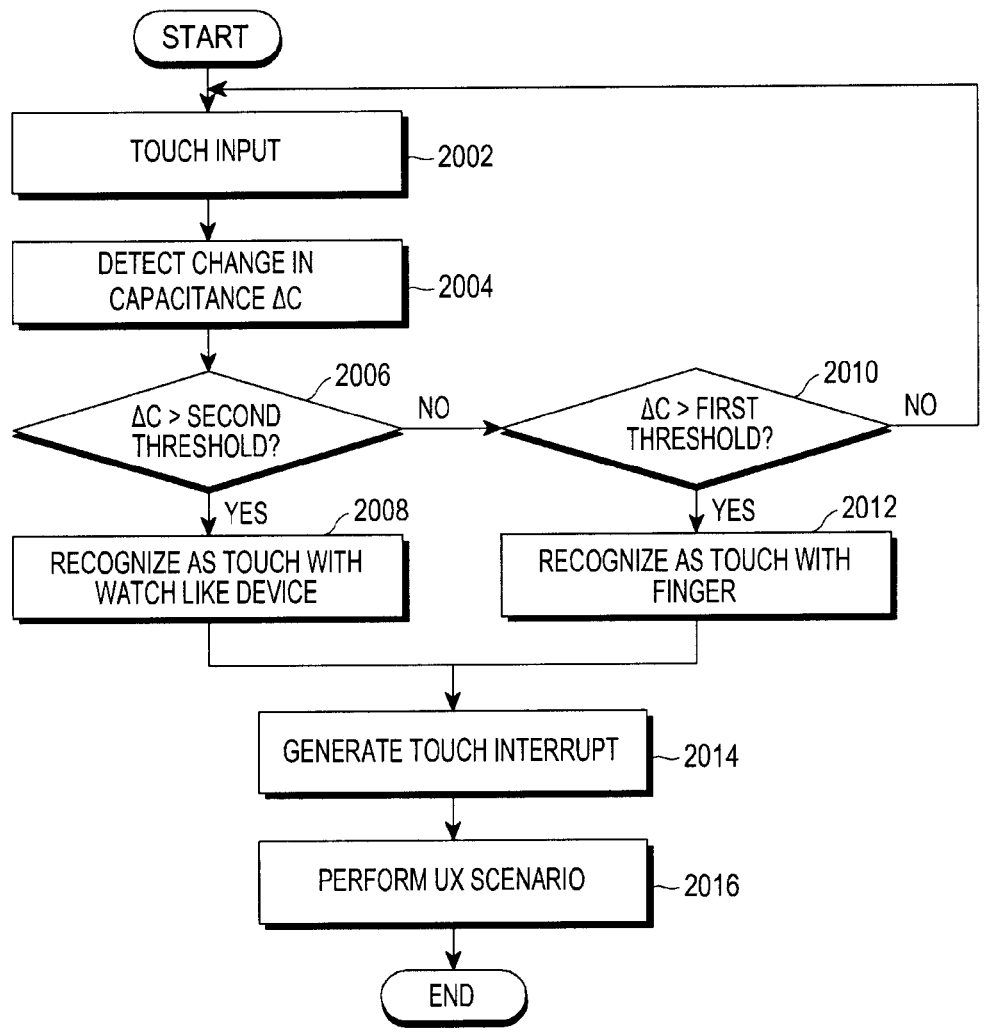
FIG. 20 is a flowchart illustrating a further example method in accordance with aspects of the present disclosure.

FIG. 20 is a flowchart illustrating an example method to distinguish input made with or without a wearable device in accordance with aspects of the present disclosure. Referring to FIG. 20, upon reception of a touch input in operation 2002, the first electronic device may recognize a change in capacitance $\Delta C$ in operation 2004.

If the change in capacitance $\Delta C$ is greater than a second threshold, in operation 2006, the first electronic device may determine that the touch input is made with a watch like device in operation 2008. Otherwise, if the change in capacitance $\Delta C$ is not greater than the second threshold, in operation 2006, but greater than the first threshold, in operation 2010, the first electronic device may determine that the touch input is made without a watch like device in operation 2012. If the change in capacitance $\Delta C$ is not greater than the first threshold, in operation 2010, the first electronic device may determine that no touch input is detected.

Upon recognition of a touch with or without the watch like device based on the first threshold or the second threshold, the first electronic device may generate a touch interrupt in operation 2014 and perform an input process in accordance with a predefined user experience scenario in operation 2016.

A method for operating an electronic device in accordance with aspects of the present disclosure may include setting, by a first electronic device, information for distinguishing input types; detecting, by the first electronic device, an input; and identifying, by the first electronic device, whether the input corresponds to an input type associated with the second electronic device, based on the information.

In another example, the information for distinguishing input types may comprise a voltage level of an electric field produced by an electrode of the second electronic device. In a further example, the information for distinguishing input types may comprise a pattern of an electric field produced by an electrode of the second electronic device. In yet a further example, the information for distinguishing input types may comprise a frequency of an electric field produced by an electrode of the second electronic device.

In one aspect, the input associated with the second electronic device may be a touching or hovering activity made while the user wears the second electronic device. In a further aspect, determining whether the user input is associated with the second electronic device may include detecting, by the first electronic device, a change in capacitance due to the input; and identifying, by the first electronic device, that the input corresponds to an input type associated with the second electronic device, when the change in capacitance corresponds to information for identifying input types associated with the second electronic device.

In yet a further aspect, the method may further include sending the settings information from the first electronic device to the second electronic device. The information for identifying a user input may vary in real time.

If the user input is a touch or hover input associated with the second electronic device, the first electronic device may operate in an alternate mode.

Another example method in accordance with aspects of the present disclosure may include detecting, by a first electronic device, input; identifying, by the first electronic device, a change in capacitance due to the input; identifying, by the first electronic device, a touch input that is not associated with a second electronic device, when the change in capacitance corresponds to a first range; and identifying, by the first electronic device, a touch input that is associated with the second electronic device, when the change in capacitance corresponds to a second range. In a further example, the first range may be between a first threshold and a second threshold which is greater than the first threshold, and the second range may be greater than the second threshold.

In another example, the first electronic device may operate in an alternate mode, when the input is associated with the second electronic device.

Figure 21:
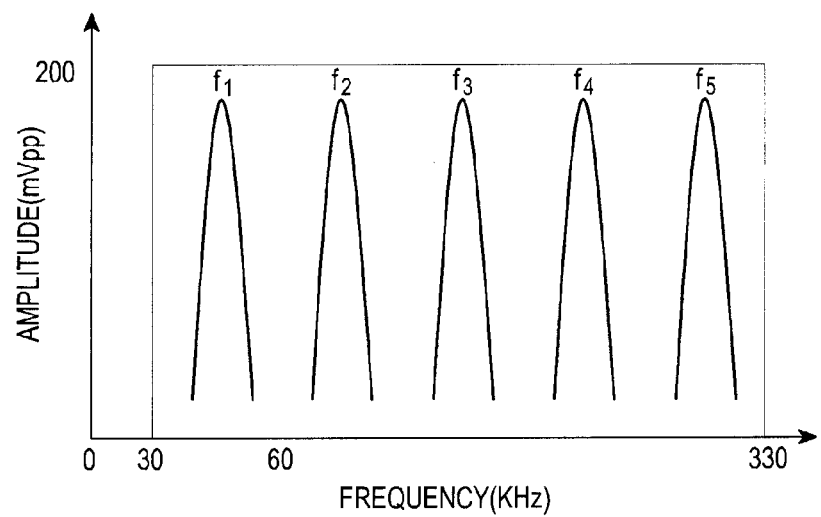
FIG. 21 and FIG. 22 illustrate example touch frequency spectrums that may be available in accordance with aspects of the present disclosure.
Figure 22:
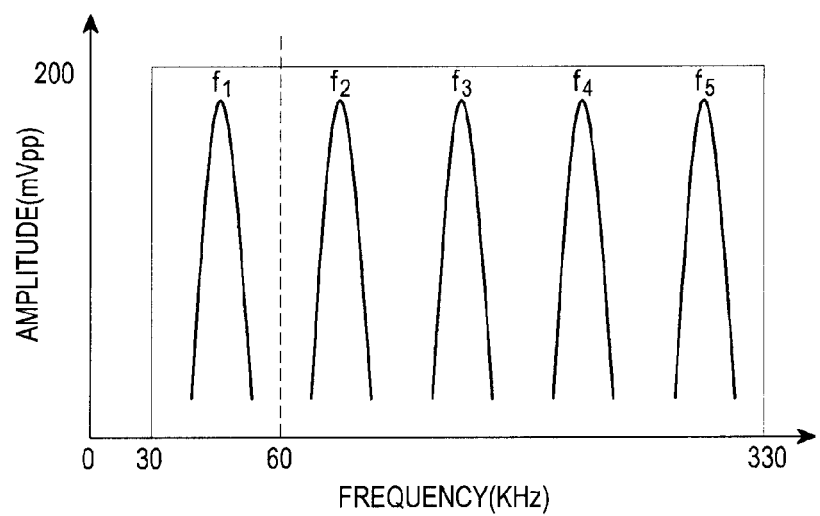

FIGS. 21 and 22 show example touch frequency spectrums. Referring to FIG. 21, n frequencies, e.g., 5 frequencies, f1, f2, f3, f4, and f5 to be driven to a TX electrode pattern may be selected in a particular frequency range (e.g., 30 KHz-330 KHz) for the smart phone to sense a touch. With the selection of n frequencies, the smart phone may hop among those sensing frequencies when a variety of electromagnetic noises are detected.

Also, referring to FIG. 22, in various examples of the present disclosure, available touch frequency spectrums may be set up for the watch like device. A frequency area not overlapping the sensing frequencies, e.g., 30 KHz-60 KHz for general touches made without the watch like device may be selected for the watch like device, and the rest of the frequency band, e.g., 61 KHz-330 KHz may be selected as a frequency band for sensing touches in general smart phones.

Figure 23:
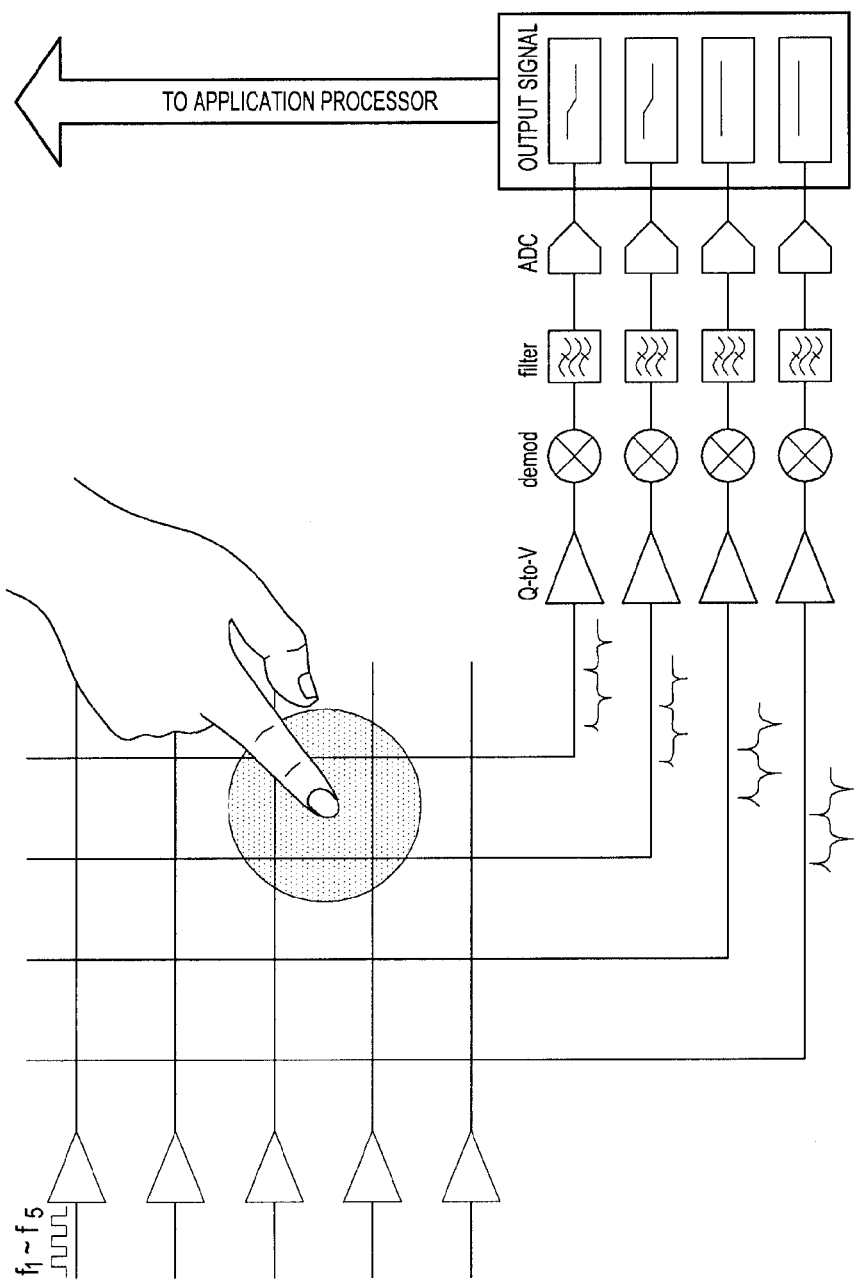
FIG. 23 is a working example of a touch controller operating when a touch is made.

FIG. 23 a working example of a touch controller operating when a touch is made. Referring to FIG. 23, if a general touch without the watch like device is made, the smart phone may select one of the 5 frequencies, f1 to f5 and send a signal with the selected frequency to the TX electrode pattern, and the signal may be induced to the RX electrode pattern.

The signal induced to the RX electrode pattern may be used by the following modules to generate output data to be sent to a processor (e.g., AP):

① electric field to voltage (Q-to-V) conversion module for converting an electric field (E-field) to a voltage, ② demodulator module for multiplying a frequency signal, such as a signal driven from the TX electrode pattern, ③ filter module for eliminating noise in other band than sensing frequencies, ④ Analog to Digital Converter (ADC) module for converting an analog voltage to a digital voltage, and ⑤ output data module for outputting an average of the digital voltage level.

More specifically, if a touch is made with the finger, an electric field induced to the RX electrode pattern is converted into a voltage by the Q-to-V conversion module, the voltage signal having the same frequency as that of the TX signal. From the voltage signal, the same frequency components as in the TX signal are canceled by the modulator module and the filter module and thus only a DC component remains. The DC component may be sampled by the ADC module and integrated for a particular section. The resultant value may be stored in a register as output data. The output data may be sent to the AP for determining touch coordinates.

Figure 24:
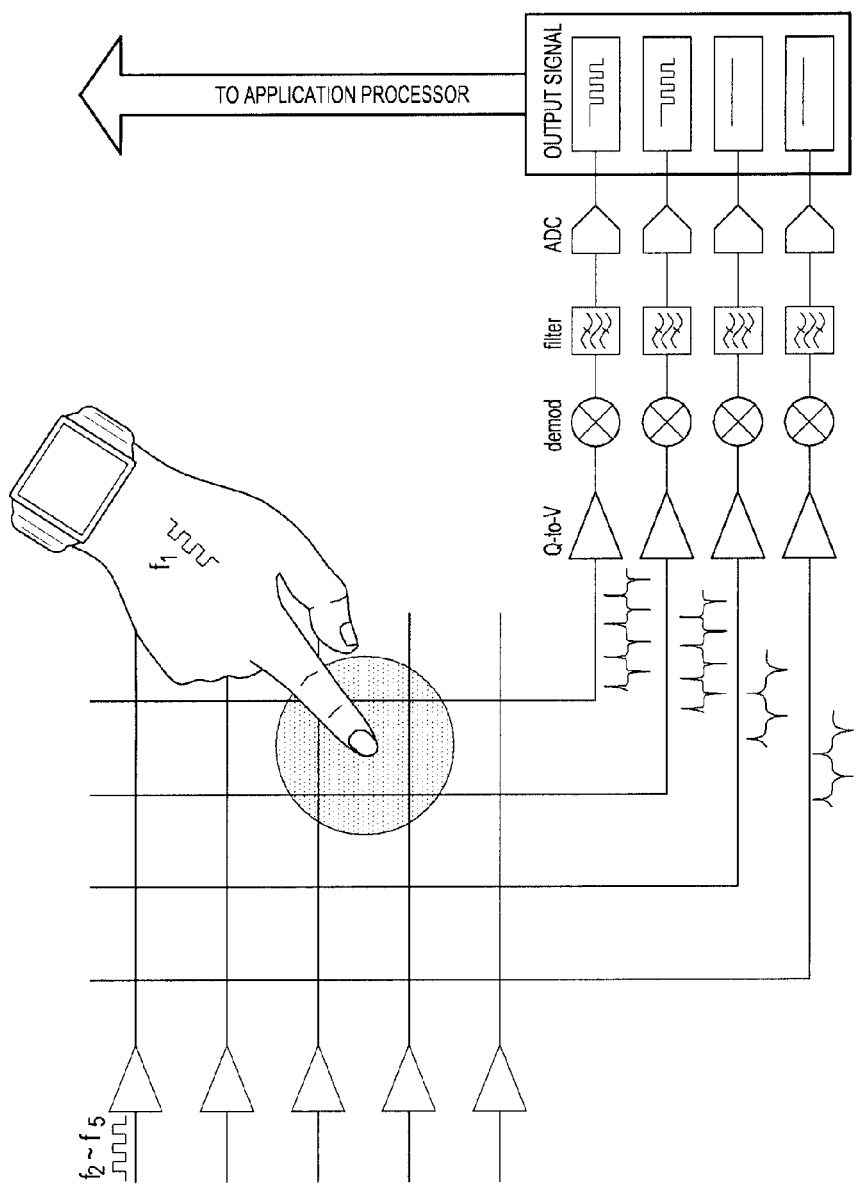
FIG. 24 is a working example of a touch controller operating when a touch is made by a hand wearing a watch-like device.

FIG. 24 is a working example of a touch controller operating when a touch is made by a hand wearing a watch-like device. Referring to FIG. 24, with a touch input with the watch like device, an f1 frequency signal generated by the watch like device is not canceled but remains even after undergoing the conversion process as described in connection with FIG. 23, because the frequency f1 is different from any of f2 to f5. Accordingly, detecting the f1 frequency signal generated in the watch like device is possible. As such, touches made by the user wearing a watch like device may be identified in an electronic device by assigning a predefined frequency for the watch like device to generate a signal.

Figure 25:
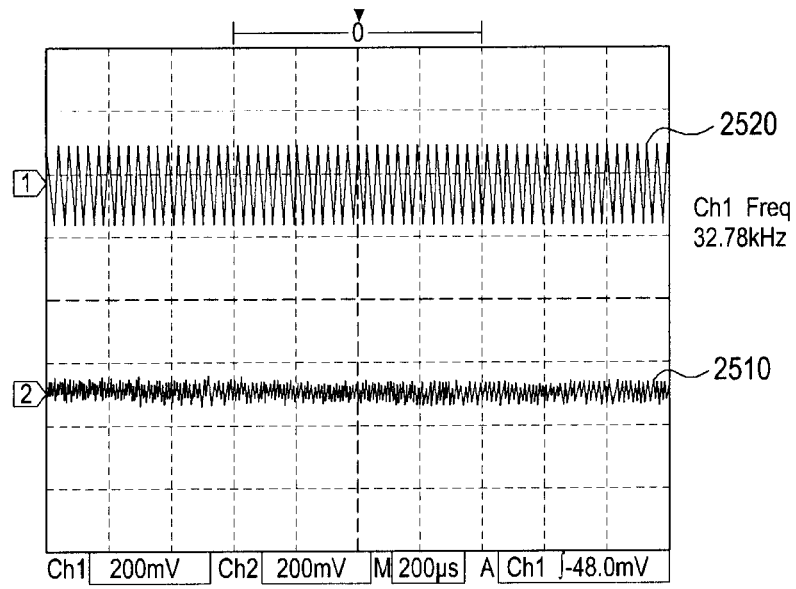
FIG. 25 is an example graph for comparing occasions of wearing and not wearing a watch-like device.

FIG. 25 is a graph for comparing occasions of wearing and not wearing a watch-like device. FIG. 25 represents an oscilloscope screen showing signals detected by the oscilloscope from a person who may or may not wear a prototype watch like device on his/her hand, the prototype watch like device inducing about a 30 KHz frequency signal to the hand while being worn by the person. Referring to FIG. 25, a signal 2520 representing one detected from the person when he/she wears the watch like device and a signal 2510 representing one detected from the person when he/she does not wear the watch like device are shown differently. Therefore, when a touch event occurs in an electronic device, the electronic device may determine whether the watch like device is worn or not worn by detecting such different signals.

Figure 26:
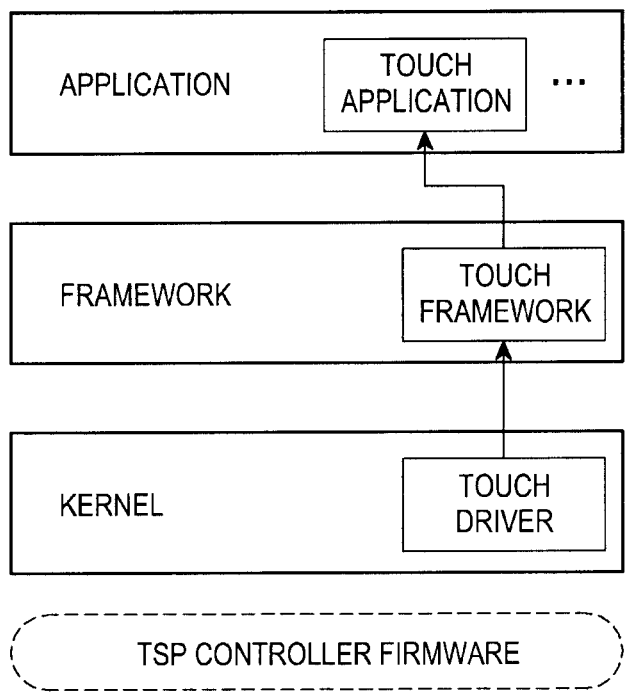
FIG. 26 is an example software structure for touch recognition in accordance with aspects of the present disclosure.

FIG. 26 illustrates example software structure for touch recognition. Referring to FIG. 26, a touch driver of a kernel layer reads out an output value of a touch controller firmware (TSP controller firmware), calculates coordinates of the touch position, and sends the coordinates to a touch framework of a framework layer. The touch framework may identify a function of a corresponding touch and sends the identified result for a touch application of an application layer to perform an operation for the corresponding touch function.

The touch controller firmware may be incorporated in the touch controller and the remaining layers of FIG. 26 may be implemented in the application processor.

Various examples of an electronic device that employ the techniques described above will be described with reference to FIGS. 27 to 41.

Figure 27:
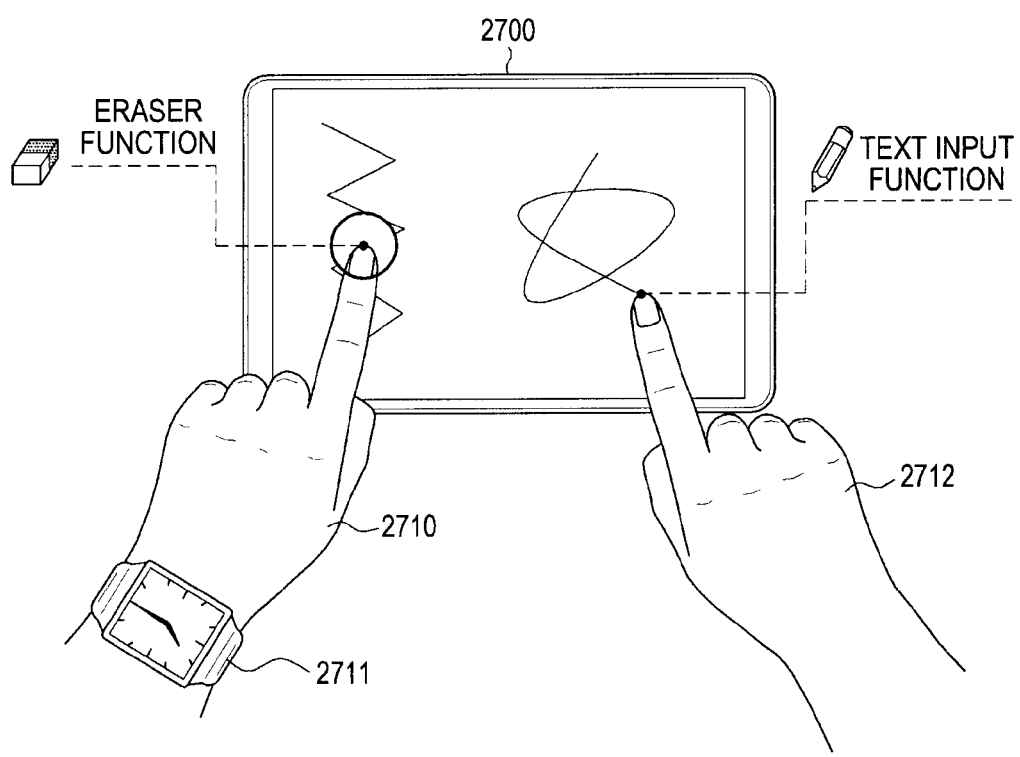
FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40 and FIG. 41 are working examples of applications running in an electronic device for handling user input in accordance with aspects of the present disclosure.

FIGS. 27 to 41 illustrate various example applications running in an electronic device. Referring to FIG. 27, while running a writing input related application, a first electronic device 2700 may deal with a touch by a hand 2710 wearing a second electronic device 2711 and a touch by a hand 2712 not wearing the second electronic device 2711 differently.

For example, while running the writing input related application, the hand 2712 not wearing the second electronic device 2711 may perform a pen input function and the hand 2710 wearing the second electronic device 2711 may perform an eraser function.

More specifically, if a touch is made by the hand 2710 wearing the second electronic device 2711, an eraser function may be set up and an image at the touch point may be erased. On the other hand, if a touch is made by the hand 2712 not wearing the second electronic device 2711, a writing input function may be set up and a writing input at the touch point may be handled.

As such, by distinguishing touch inputs made by hands wearing and not wearing a watch like device in accordance with the examples of the present disclosure, both functions may be simultaneously handled without need to change settings on a screen (e.g., change settings from an eraser function to a writing input function or vice versa).

Figure 28:
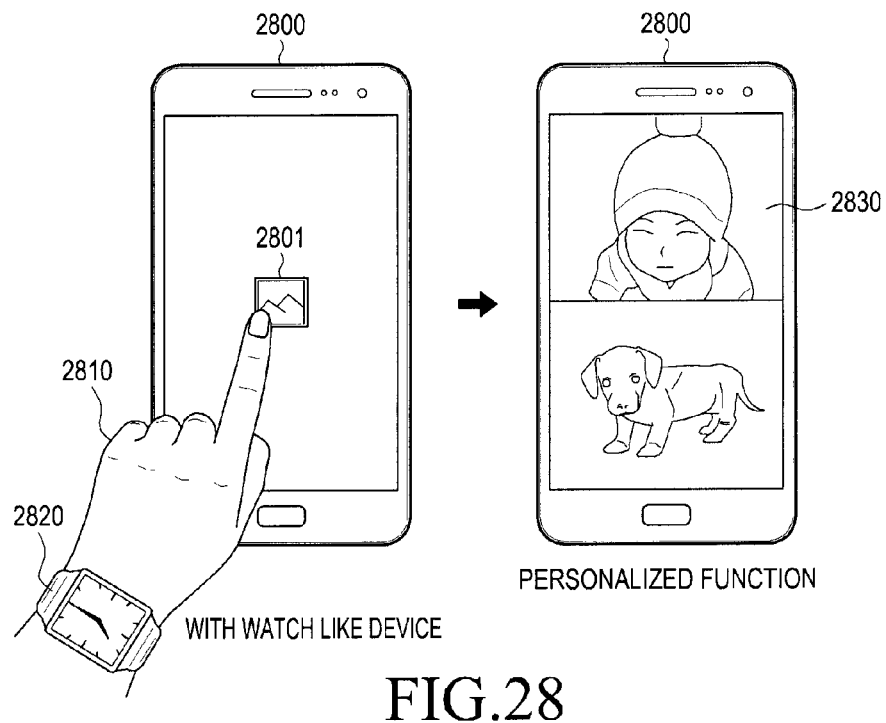
Figure 29:
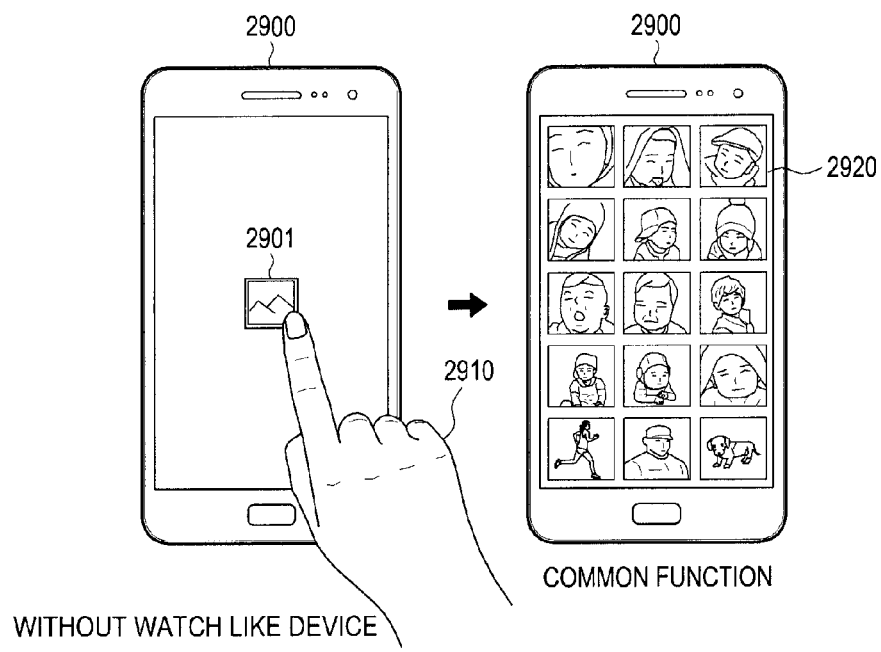

Referring to FIGS. 28 and 29, while running a particular application, a first electronic device 2800 or 2900 may deal with a touch by a hand 2810 wearing a second electronic device 2820 and a touch by a hand 2910 not wearing the second electronic device 2820 differently.

For example, in case of selecting an identical icon 2801, 2901 with a touch, if the touch is made by the hand 2810 wearing the second electronic device 2820, the first electronic device 2800 may present a screen 2830 for a personalized function; and if the touch is made by a hand 2910 not wearing the second electronic device 2820, the first electronic device 2900 may present a screen 2920 for a general function. Accordingly, a personalized function in need of security in a particular application may be performed without undergoing a separate authentication process.

More specifically, for example, as shown in FIG. 29, if an album icon is touched by the hand 2910 not wearing the second electronic device on the screen of the first electronic device 2900, the first electronic device 2900 may operate in public mode (for example, a mode to display photos for which security is set or to display photos exclusive of pictures of people); and otherwise, if the album icon is touched by the hand 2810 wearing the second electronic device 2820, the first electronic device 900 may operate in personalized mode (for example, a mode to display both photos for which security is set and security is not set or to even display pictures of people).

Figure 30:
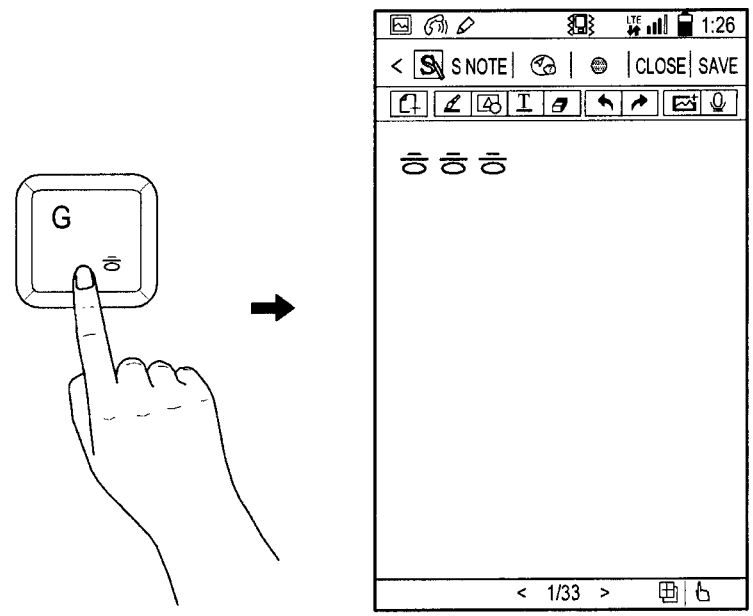
Figure 31:
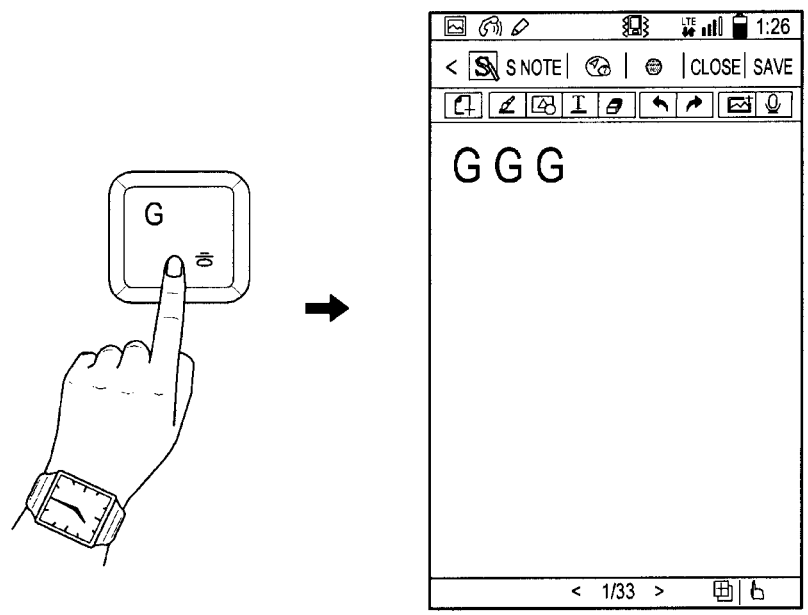

Referring to FIGS. 30 and 31, with respect to a character key displayed on the screen of the first electronic device, a touch made by a hand wearing the second electronic device and a touch made by a hand not wearing the second electronic device may be handled as different character inputs. For example, in entering a character input, a touch made by a hand not wearing the second electronic device may be handled in accordance with a basic character input system (e.g., for Korean letters, lower case letters, etc.), and a touch made by wearing the second electronic device may be handled in accordance with a transformed character input system (e.g., for shift inputs, foreign letters, upper case letters, double consonants, symbols, etc.).

More specifically, for example, in case of entering text, as shown in FIG. 30, a touch made against a particular character key (e.g., 'G' or 'ㅎ' character key) by a hand not wearing the second electronic device may be handled as a Korean letter (e.g., 'ㅎ') or double consonant letter input in accordance with a basic character input system. On the other hand, as shown in FIG. 31, a touch made against the particular character key (e.g., 'G' or 'ㅎ' character key) by a hand wearing the second electronic device may be handled as a transformed letter input (e.g., 'G'), such as a foreign character or a shift input in accordance with a transformed character input system.

As such, by distinguishing touches made by a hand wearing the watch like device and a hand not wearing the watch like device, the user may easily enter text in both input modes without need for switching between text input modes (e.g., changing from Korean to English or from English to Korean).

Figure 32:
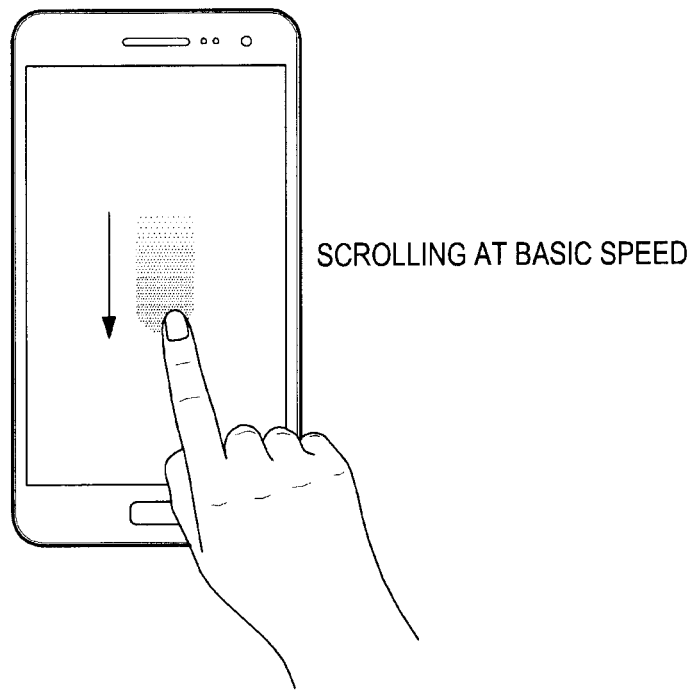
Figure 33:
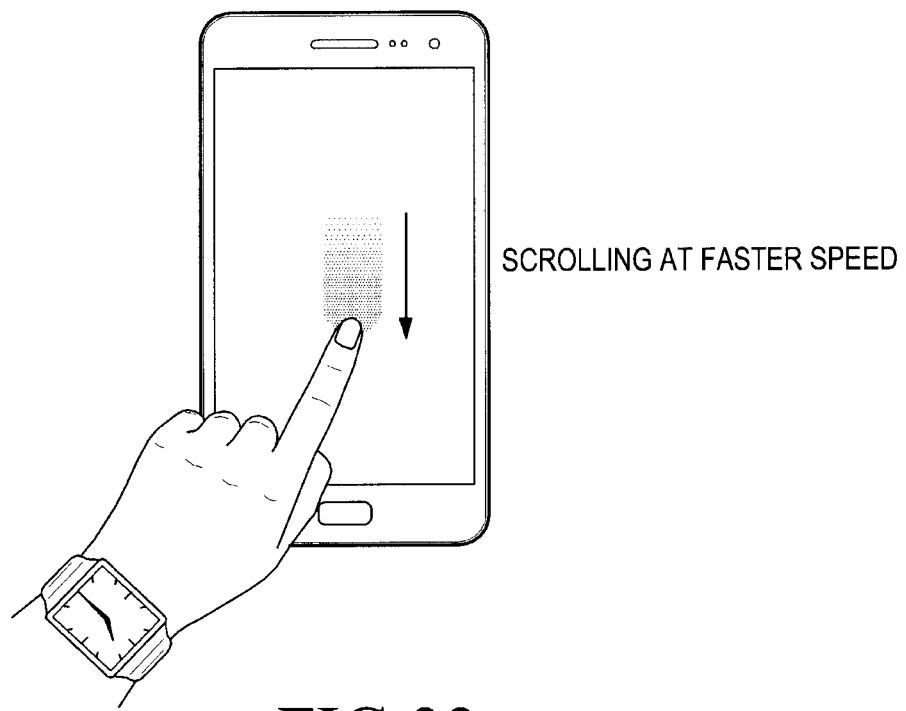

Referring to FIGS. 32 and 33, while running a particular application, the first electronic device may handle a touch made by a hand wearing the second electronic device and a touch made by a hand not wearing the second electronic device as different inputs. By distinguishing touches, various gestures (e.g., drag or swipe) associated with the touches may be distinguished and handled differently. For example, with respect to screen scrolling, the first electronic device may handle the scrolling with a hand not wearing the second electronic device at a basic speed, and handle the scrolling with a hand wearing the second electronic device at a faster speed.

More specifically, as shown in FIG. 32, if a user drags or swipes his/her hand not wearing the second electronic device down the screen of the first electronic device, the first electronic device may scroll the screen at a predetermined common speed (a first speed). On the other hand, as shown in FIG. 33, if a user drags or swipes his/her hand wearing the second electronic device down the screen of the first electronic device, the first electronic device may scroll the screen at a speed faster than the predetermined common speed (a second speed).

Figure 34:
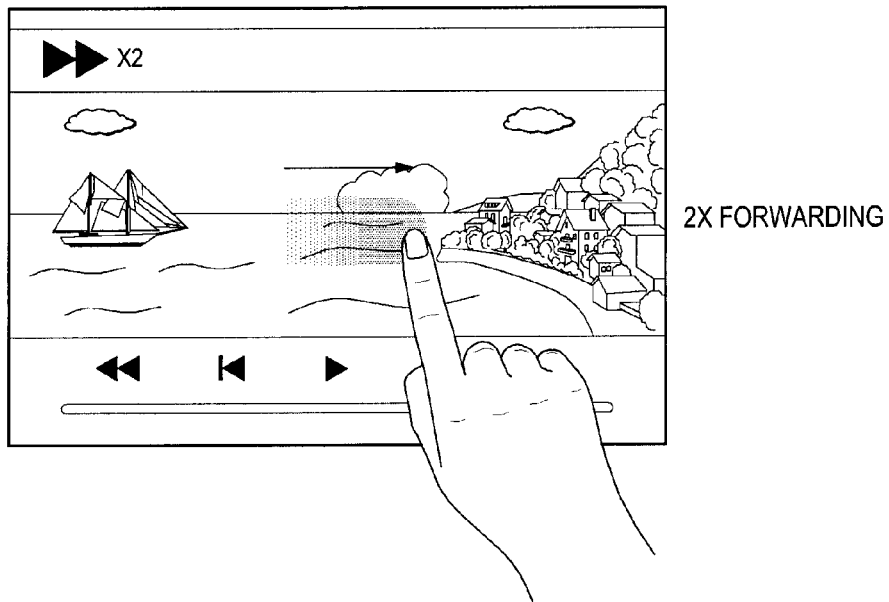
Figure 35:
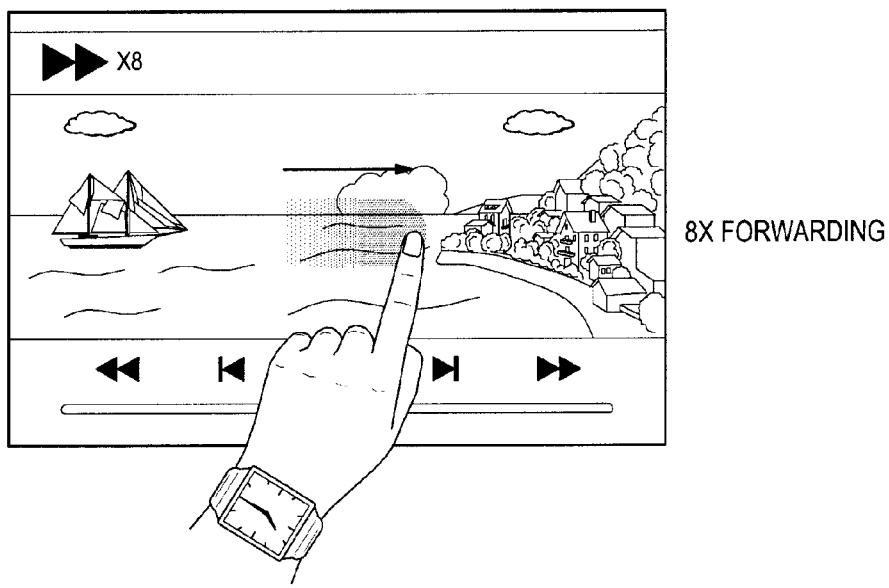

Referring to FIGS. 34 and 35, while running a video playback application, a first electronic device may handle a touch made by a hand wearing a second electronic device and a touch made by a hand not wearing the second electronic device as different inputs.

For example, as shown in FIG. 34, if a user drags or swipes his/her hand not wearing the second electronic device in the right direction of the screen of the first electronic device, the first electronic device may play the video at a predetermined speed (e.g., $2x$). On the other hand, as shown in FIG. 35, if a user drags or swipes his/her hand wearing the second electronic device in the right direction of the screen of the first electronic device, the first electronic device may play the video at a speed faster than the predetermined speed (e.g., $8x$).

Figure 36:
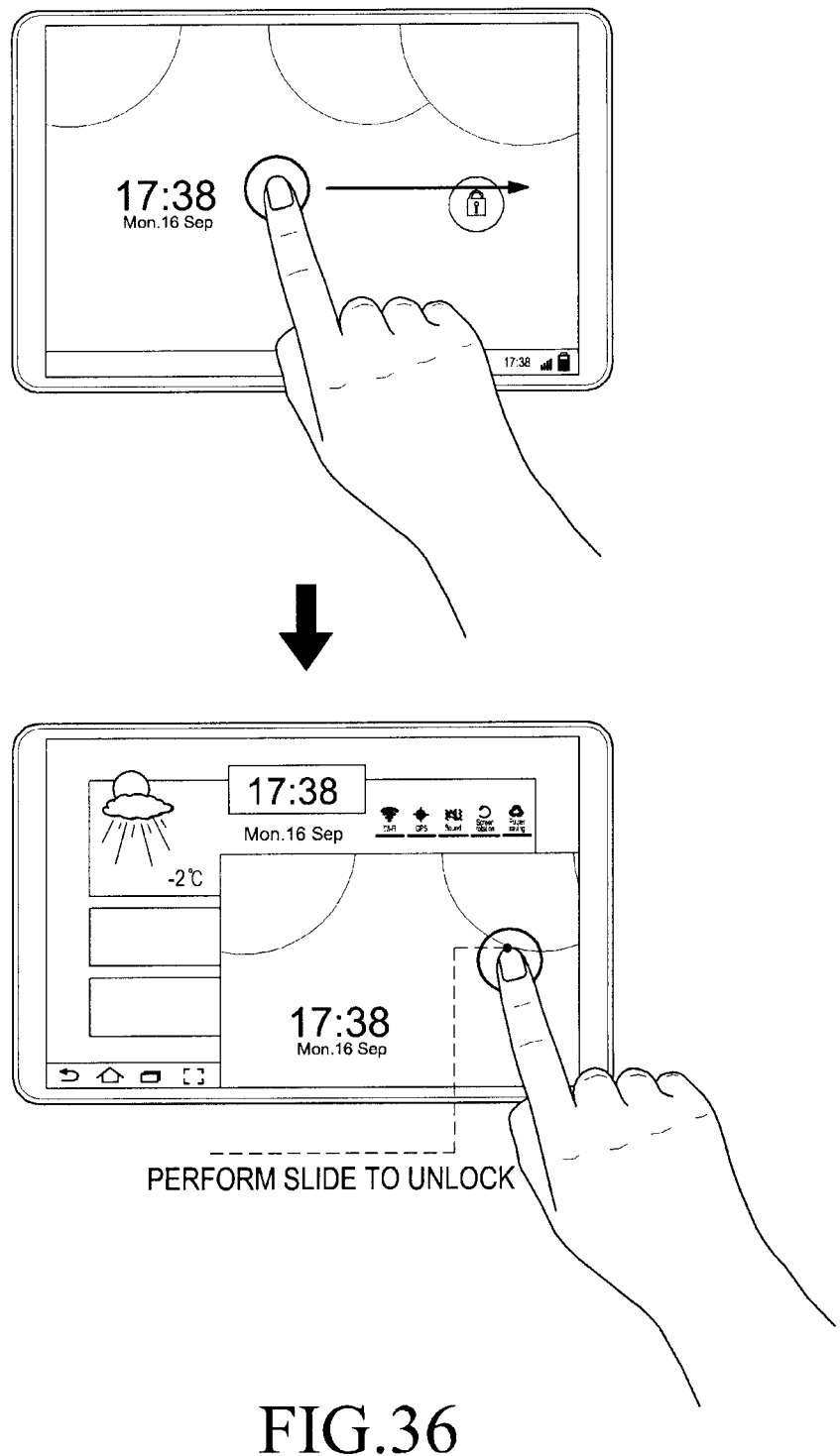
Figure 37:
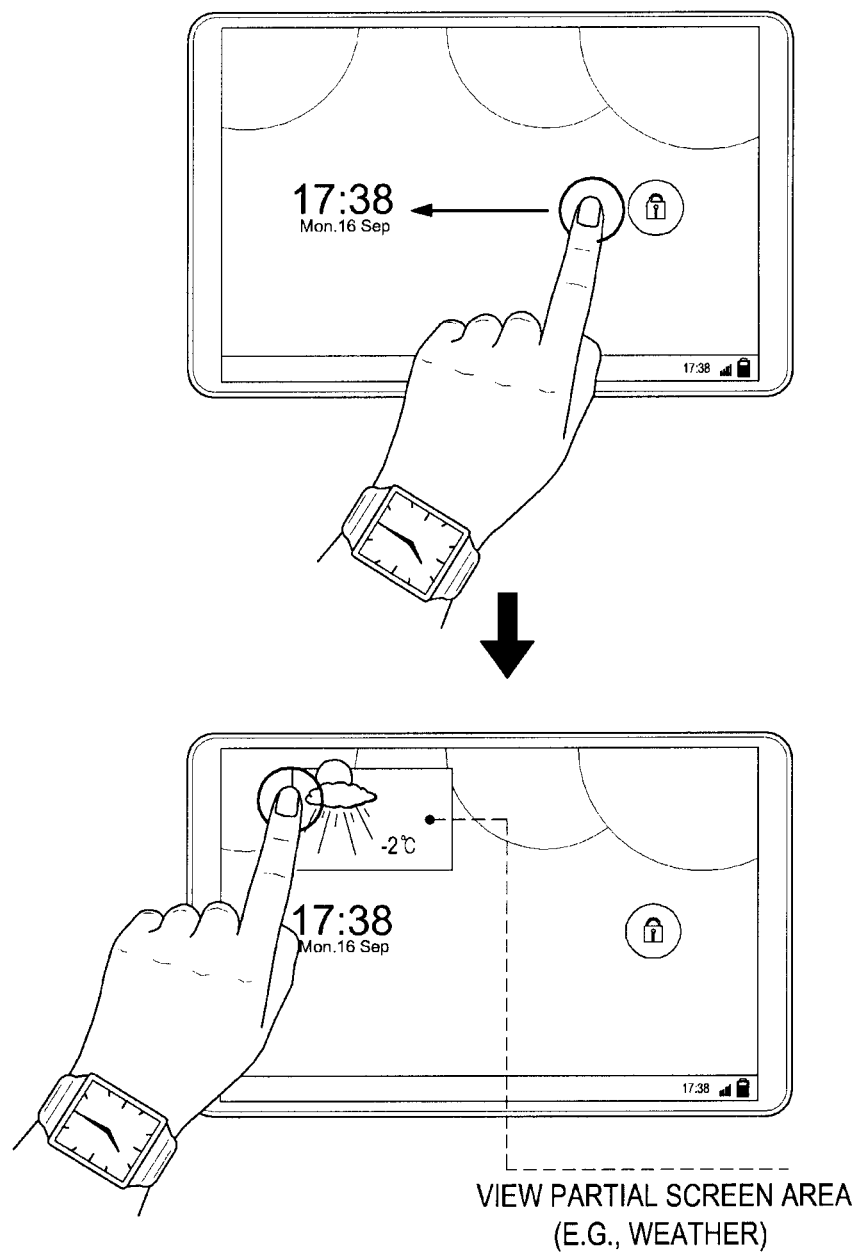

Referring to FIGS. 36 and 37, while the screen is locked in the first electronic device, a touch made by a hand not wearing the second electronic device may lead to unlocking the screen in accordance with an existing unlock mechanism and a touch made by a hand wearing the second electronic device may implement an effect of making only a part of the screen viewed as if to scrape the frost off the part.

For example, as shown in FIG. 36, if a touch is made by a hand not wearing the second electronic device, the first electronic device may unlock the screen in accordance with a common unlock mechanism, and as shown in FIG. 37, if a touch is made by a hand wearing the second electronic device, the first electronic device may unlock and view only a part of the screen where the touch is made while holding the screen lock.

Figure 38:
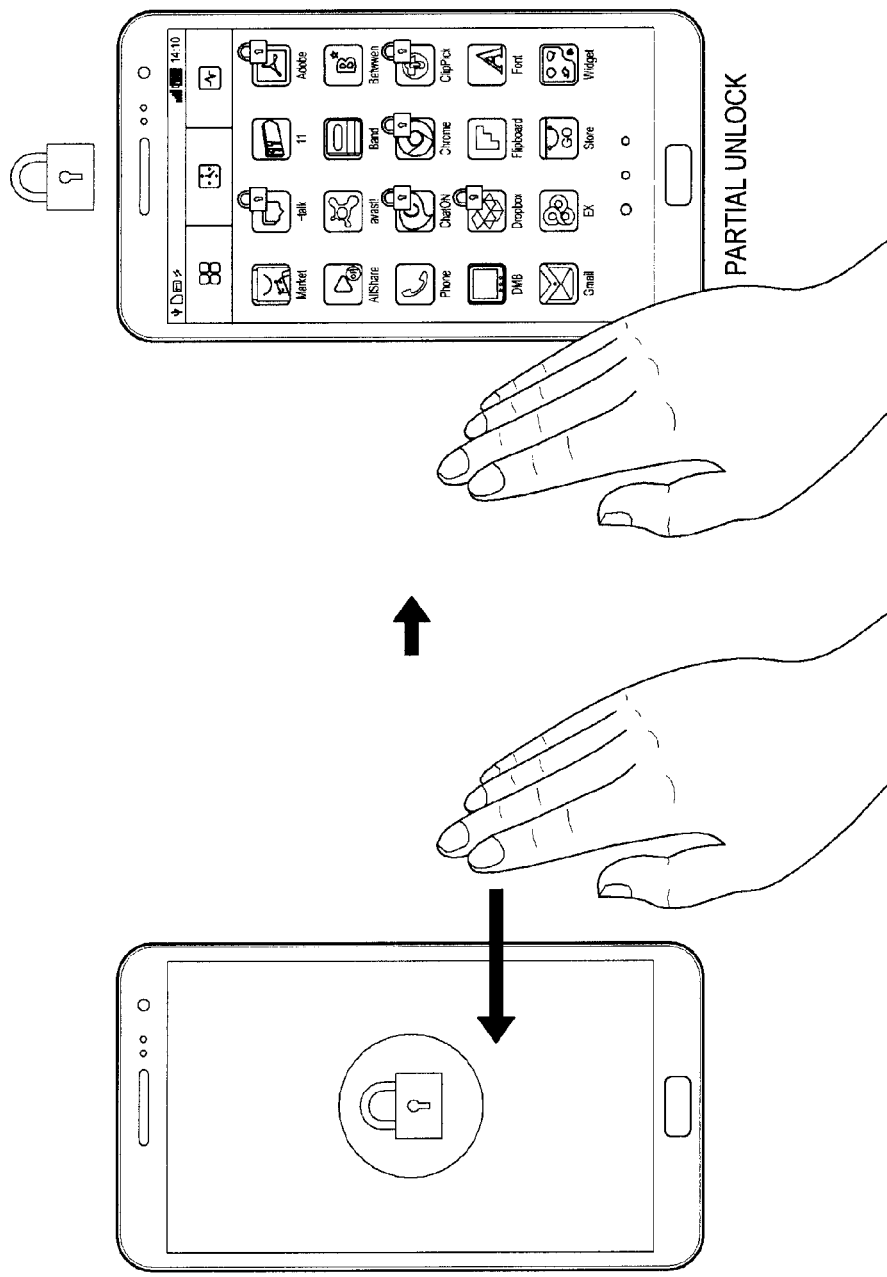
Figure 39:
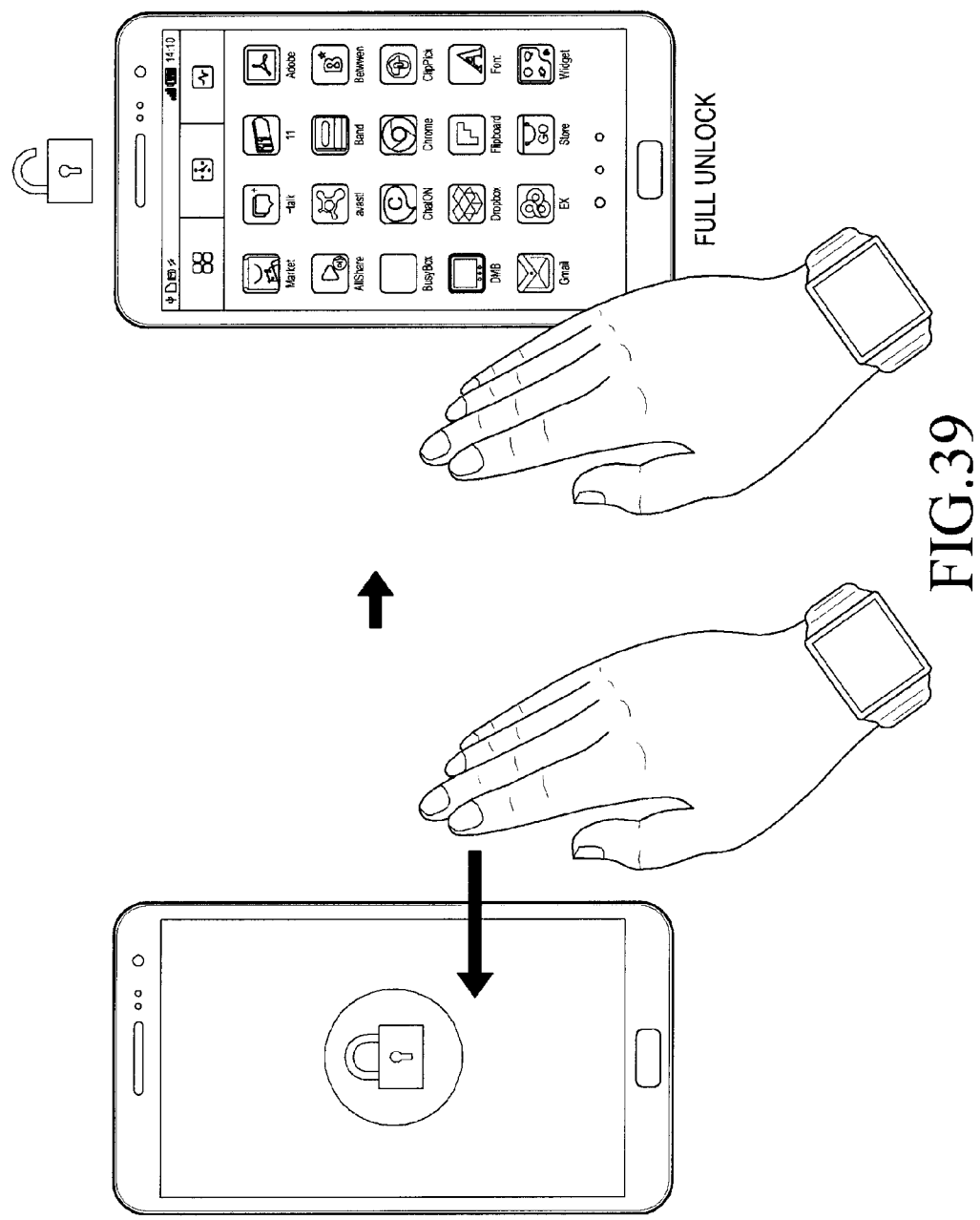

Referring to FIGS. 38 and 39, while running a particular application, the first electronic device (e.g., a smart phone) may handle a touch or gesture made by a hand wearing the second electronic device (e.g., a watch like device) and a touch or gesture made by a hand not wearing the second electronic device as different inputs.

For example, even if the same touch or gesture is made on the first electronic device to unlock the locked screen, different unlock mechanisms may be provided in accordance with whether the touch or gesture is made by a user wearing the second electronic device or by a hand not wearing the second electronic device. For example, as shown in FIG. 39, if a touch or gesture is made by a hand wearing the second electronic device, a screen unlocked for the entire applications may be provided. On the other hand, as shown in FIG. 38, if a touch or gesture is made by a hand not wearing the second electronic device, the first electronic device may provide a partially unlocked screen by unlocking the screen for some applications (e.g., essential applications or low-security level applications) while keeping the screen locked for the remaining applications (e.g., call list, gallery, mail, messenger applications, etc.). Therefore, various security functions may be provided by the first electronic device by identifying users based on whether they wear a watch like device.

Figure 40:
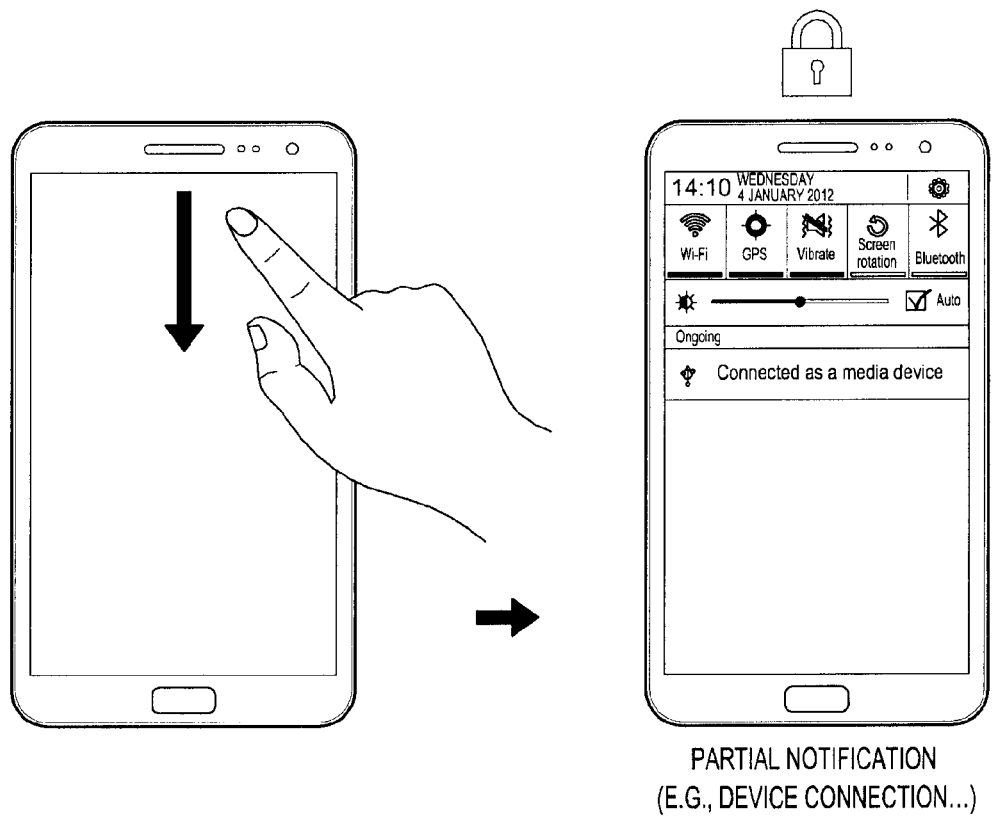
Figure 41:
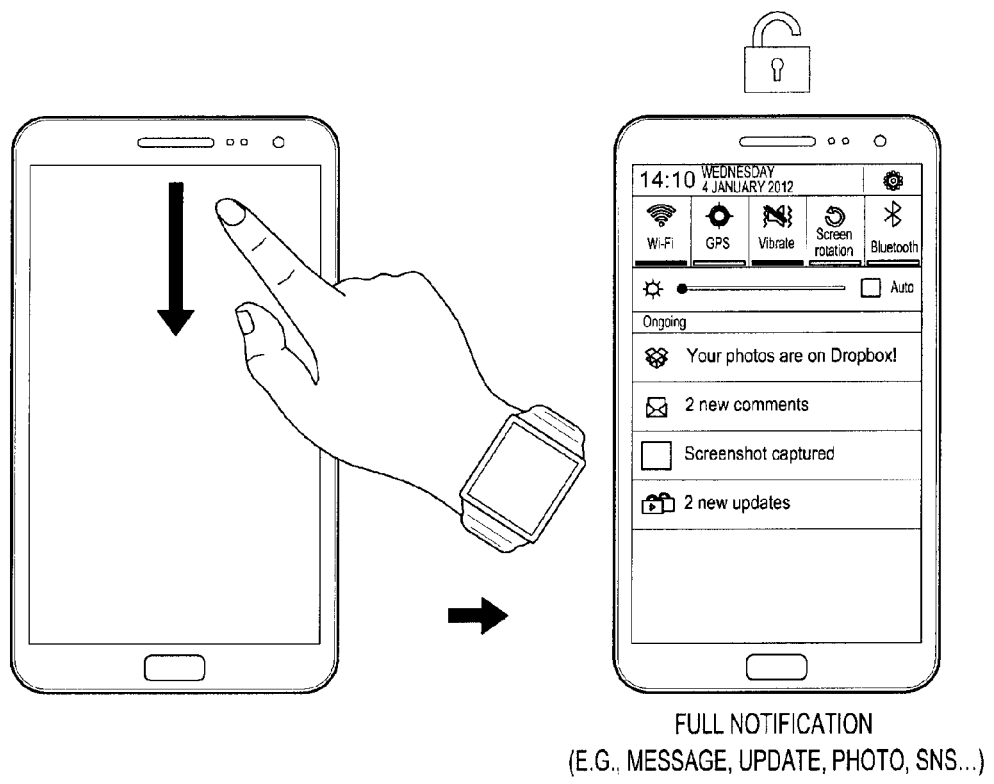

Referring to FIGS. 40 and 41, while displaying a home screen, the first electronic device (e.g., a smart phone) may provide different notification bars for a touch or gesture made by a hand wearing the second electronic device (e.g., a watch like device) and a touch or gesture made by a hand not wearing the second electronic device.

For example, even if the same touch or gesture is made on the home screen of the first electronic device, different information may be provided based on whether the touch or gesture is made by a user wearing the second electronic device or by a hand not wearing the second electronic device. For example, as shown in FIG. 41, if a touch or gesture (e.g., a gesture for listing notification bars) is made by a hand wearing the second electronic device, the first electronic device may display entire notifications (e.g., notifications about incoming messages, updates, photos, Social Network Service (SNS), etc.) on the screen. On the other hand, as shown in FIG. 40, if a touch or gesture is made by a hand not wearing the second electronic device, the first electronic device may display only some notifications (e.g., notifications with low necessity for personal security) without displaying the remaining notifications (e.g., notifications in need of personal security, such as notifications about incoming messages, updates, SNS, etc.). Therefore, various security functions may be provided in the first electronic device by limiting the range of information to be provided through the notification bars in the home screen based on whether the touch is made by a hand wearing the watch like device or a hand not wearing the watch like device.

Figure 42:
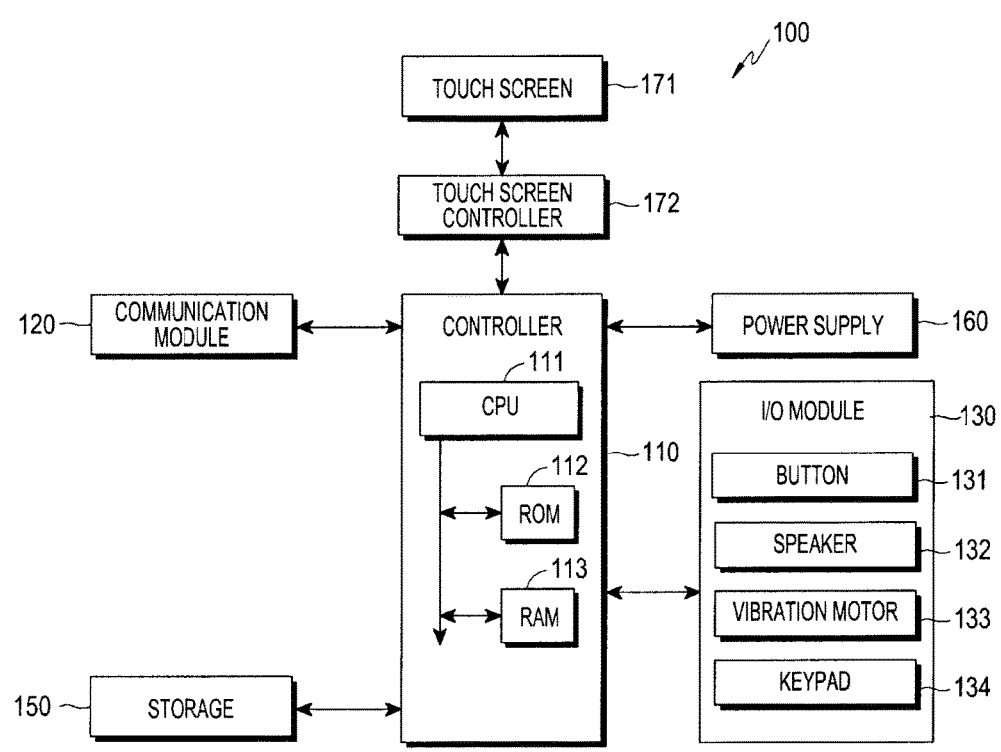
FIG. 42 is a block diagram of an example electronic device in accordance with aspects of the present disclosure.

A block diagram of an example electronic device will be described with reference to FIGS. 42 to 44. FIG. 42 is a block diagram of an example electronic device 100. The electronic device 100 may correspond to the first electronic device 100a or the second electronic device 100b.

The electronic device 100 may be any device that includes a display unit and may be also referred to as a camera, a portable terminal, a communication terminal, a portable communication terminal, a portable mobile terminal, etc. For example, the electronic device may be a digital camera, a smart phone, a cell phone, a game console, a television, a display device, a head unit for vehicle, a notebook computer, a laptop computer, a tablet computer, a Personal Media Player (PMP), a Personal Digital Assistant (PDA), a GPS, an automatic teller machine (ATM) for banks, a point of sale (POS) for shops, etc. The electronic device may also be a flexible device or a flexible display device.

As an example of the electronic device 100, the first electronic device 100a may be a portable device (e.g., a cell phone, a smart phone, etc.), and the second electronic device 100b may be a wearable device (e.g., a watch like device, a glass like device, a cloth like device). Among the following components of the electronic device 100, some may be omitted or replaced if necessary. A detailed configuration of the electronic device 100 to which the examples of the present disclosure are applied will be described in connection with FIG. 42.

Referring to FIG. 42, the electronic device 100 may include a controller 110, a communication module 120, an input/output (I/O) module 130, a storage 150, a power supply 160, a touch screen 171, and a touch screen controller 172.

The controller 110 may include a Central Processing Unit (CPU) 111, a Read Only Memory (ROM) 112 for storing a control program to control the electronic device 100, and a Random Access Memory (RAM) 113 for storing signals or data input from an outside or for being used as a memory space for working results of the electronic device 100. The CPU 111, ROM 112, and RAM 113 may be connected to each other via an internal bus. The controller 110 may control the communication module 120, the I/O module 130, the storage 150, the power supply 160, the touch screen 171, and the touch screen controller 172. Further, the controller 110 may include a single core, or multiple cores like dual cores, triple cores, quad cores, or the like. It would be appreciated that the number of cores may depend on the features of the electronic device 100.

The communication module 120 may include at least one of a cellular module, a Wireless Local Area Network (WLAN) module, and a short range communication module. The cellular module connects the electronic device 100 to an external device through mobile communication using at least one—one or more—antennas under control of the controller 110. The cellular module transmits/receives wireless signals for voice calls, video conference calls, Short Message Service (SMS) messages, or Multimedia Messaging Service (MMS) messages to/from a cell phone, a smart phone, a tablet PC, or other electronic devices.

The WLAN module may be connected to the Internet in an effective range of a wireless Access Point (AP) (not shown), under control of the controller 110. The WLAN module supports IEEE's WLAN standard IEEE802.11x. The WLAN module may operate Wi-Fi Positioning System (WPS) that identifies position of the electronic device comprised of the WLAN module using position information provided from the AP.

The short range module handles wireless short range communication of the electronic device 100 under control of the controller 110 based on a short range communication scheme, such as Bluetooth, Infrared Data Association (IrDA), Wi-Fi-Direct, Near Field Communication (NFC), etc.

Furthermore, it will be appreciated that the communication module 120 may perform data communication based on a predetermined communication scheme (e.g., USB communication, serial communication, etc.) with another electronic device connected via a USB communication cable, serial communication cable, etc.

The I/O module 130 may include at least one of a button 131, a speaker 132, and a vibration motor 133.

The button 131 may be arranged on the front, side, or back of the housing of the electronic device 100, and may include at least one of power/lock button (not shown), volume button (not shown), menu button, home button, back button, and search button.

The speaker 132 may output a sound out of the electronic device 100 corresponding to various signals (e.g., radio signals, broadcast signals, etc.) of the cellular module, the WLAN module, and the short range module, under control of the controller 110. There may be one or multiple speakers 132 arranged in a proper position or proper positions of the housing of the electronic device 100.

The vibration motor 133 may convert an electric signal to a mechanical vibration under control of the controller 110. There may be one or more vibration motors 133 inside the housing of electronic device 100.

The speaker 132 and the vibration motor 133 may operate based on settings of volume operation mode of the electronic device 100. For example, the volume operating mode may be set as one of sound mode, vibration mode, sound and vibration mode, silent mode, etc. The controller 110 may produce a signal to instruct an operation of the speaker 132 or the vibration motor 133 depending on functions being performed by the electronic device 100, based on which mode the volume operating mode is set to.

The storage 150 may store input/output signals or data resulting from operation of the I/O module 130 and a touch screen 171 under control of the controller 110. The storage 150 may store the control programs and applications for controlling the electronic device 100 or the controller 110.

The term "storage" implies not only the storage 150, but also a ROM 112, a RAM 113 in the controller 110, or a memory card (e.g., an SD card, a memory stick) installed in the electronic device 100. The storage may also include a non-volatile memory, volatile memory, Hard Disc Drive (HDD), or Solid State Drive (SSD).

The power supply 160 may supply power to one or more batteries (not shown) placed inside the housing of the electronic device 100 under control of the controller 110. The one or more batteries power the electronic device 100. The power supply 160 may supply the electronic device 100 with the power input from the external power source (not shown) via a cable connected to a connector included in the electronic device 100. The power supply 160 may also supply the electronic device 100 with wireless power from an external power source using a wireless charging technology.

The touch screen 171 may display a user interface corresponding to a service based on an operating system of the electronic device 100. The touch screen 171 may send an analog signal corresponding to at least one touch input to the user interface to the touchscreen controller 172. The touch screen 171 may receive the at least one touch from user's physical contact (e.g., with fingers including thumb) or via a touchable input device (e.g., a stylus pen). The touch screen 171 may receive consecutive moves of one of the at least one touch. The touch screen 171 may send an analog signal corresponding to the consecutive moves of the input touch to the touchscreen controller 172.

The touch screen 171 may be implemented in e.g., a resistive way, capacitive way, infrared way, or acoustic wave way.

The touch screen controller 172 may control an output value of the touch screen 171 such that display data provided by the controller 110 may be displayed on the touch screen 171. The touch screen controller 172 converts the analog signal received from the touch screen 171 to a digital signal (e.g., XY coordinates) and transmits the digital signal to the controller 110.

As such, the controller 110 may handle user inputs using data provided by the touch screen 171 and the touch screen controller 172. For example, the controller 110 may control the touch screen 171 using the digital signal received from the touch screen controller 172. For example, in response to the touch event or the hovering event, the controller 110 may enable a shortcut icon (not shown) displayed on the touch screen 171 to be selected or executed.

While the examples illustrate that user inputs are entered through the touch screen 171, it will be appreciated that user inputs may be recognized and handled through various other components. For example, the electronic device 100 in accordance with examples of the present disclosure may include a sensor module or a camera module, and handle user inputs using data entered through the sensor module or the camera module.

Specifically, the sensor module may be comprised of at least one sensor of a proximity sensor for detecting a user approaching the electronic device 100, an illumination sensor for detecting an amount of light around the electronic device 100, and an RGB sensor. The sensor module may further include a motion sensor for detecting motions (e.g., rotation, acceleration, or vibration) of the electronic device 100. Information detected from the sensor module may be provided to the controller 110, which may in turn handle a user input using the information.

Furthermore, the camera module may include camera(s) installed on the front or back of the electronic device 100 for capturing still images or video under control of the controller 110, and the still image or video may be provided to the controller 110. The controller 110 may handle a user input using the still image or video provided from the camera.

Figure 43:
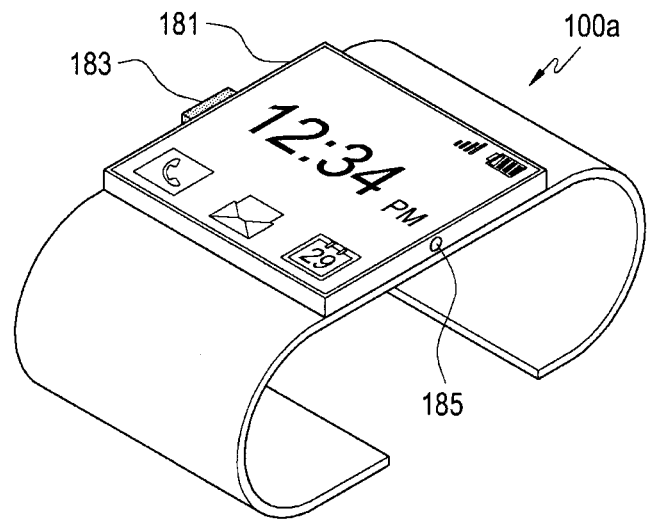
FIG. 43 is an example wearable device in accordance with aspects of the present disclosure.

FIG. 43 illustrates an example wearable device. The aforementioned watch like device in accordance with the examples of the present disclosure may be wearable around the user's wrist and may contain a central processing unit for performing arithmetic operations, a display for displaying information, a communication unit for communication with a peripheral electronic device, etc.

It also contains a camera for capturing images, which may be used for purpose of capturing or recognition.

Referring to FIG. 43, in case that the second electronic device 100b corresponds to the watch like device, the second electronic device 100b may include a storage, a controller, and an I/O unit, each of which has relatively small capacity and throughput as compared to the first electronic device 100a. For example, the watch like device may be a terminal in such a size as to be worn on a body of the user. Furthermore, the watch like device may be coupled with a hardware element (e.g., a watch band) for the user to wear the watch like device, as shown in FIG. 43.

The watch like device may also serve as an I/O device having a touch screen 171 in a predetermined size and optionally, at least one hardware button 183.

The watch like device may display an image captured by a camera 185 on the touch screen 171, or may display analysis results of an object recognized from the captured image. In an example, an electrode for producing an electric field may be formed on the rear part or on the band of the watch like device.

Figure 44:
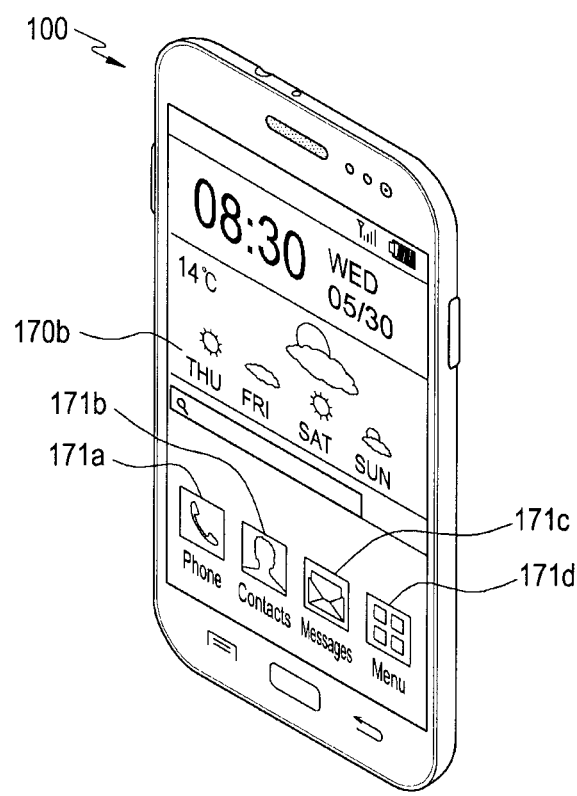
FIG. 44 is a perspective view of an example electronic device in accordance with aspects of the present disclosure.

FIG. 44 illustrates a frontal view of an example electronic device.

Referring to FIG. 44, in the center of the front face of the electronic device 100, the touch screen 171 is arranged. The touch screen 171 may be formed to take up a major portion of the front face of the electronic device 100.

A home screen displayed on the screen of the electronic device 100 may include multiple pages of different home screens, among which a first home screen may be a main home screen as shown in FIG. 44. In the main home screen, shortcut icons 171a, 171b, and 171c for running frequently-used applications, a main menu key 171d, time, weather, etc. may be displayed. If selected, the main menu key 171d displays a menu screen on the touch screen 171. In an upper part of the touchscreen 171, there may be a status bar to display the status of the electronic device 100, such as a battery charging state, intensity of received signals, current time, volume operation mode, etc.

The electronic device in accordance with the example of the present disclosure may include a touch screen configured to detect a change in capacity at a touch point; and a touch screen controller configured to determine based on set information that a touch is made by a hand not wearing a second electronic device if the change in capacity corresponds to a first range and to determine that a touch is made by a hand wearing the second electronic device if the change in capacity corresponds to a second range.

The first range is between a first threshold and a second threshold which is greater than the first threshold, and the second range is greater than the second threshold.

The electronic device may further include a controller configured to control the first electronic device to operate in a different mode from a mode for a touch input made by a hand that does not wear the second electronic device, if the user input is a touch input made by a hand that wears the second electronic device.

The electronic device may further include a communication unit for sending the set information to the second electronic device.

The electronic device in accordance with the example of the present disclosure may include a touch screen configured to detect a change in capacity at a touch point; and a touch screen controller configured to determine based on set information that a touch is made by a body contact of a user not wearing a second electronic device if the change in capacity corresponds to a first range and to determine that a touch is made by a body contact of a user wearing the second electronic device if the change in capacity corresponds to a second range.

The first range is between a first threshold and a second threshold which is greater than the first threshold, and the second range is greater than the second threshold.

The electronic device may further include a controller configured to control the first electronic device to operate in a different mode from a mode for a touch input made by a body contact of a user that does not wear the second electronic device, if the user input is a touch input made by a body contact of a user that wears the second electronic device.

The electronic device may further include a communication unit for sending the set information to the second electronic device.

A wearable device in accordance with the example of the present disclosure may include a communication unit for communicating with an electronic device and receiving set information from the electronic device; a signal generator for generating a signal based on the set information; and an electrode for being in contact with a part of a user body and producing an electric field due to the signal generated by the signal generator.

The set information may be information regarding a threshold value for a change in capacity detected from a touch screen of the electronic device.

The set information may be information regarding a voltage level of the electric field produced by the electrode.

The set information may be information regarding a generation pattern of the electric field produced by the electrode.

The set information may be information regarding a frequency of the electric field produced by the electrode.

The wearable device may be a watch like device.

The electrode may be formed in a band of the watch like device.

The electrode may be formed on a rear side of a main unit of the watch like device, the rear side being in contact with a user's body.

The wearable device may further include an amplifier for amplifying the signals generated by the signal generator by a predetermined level based on the information received through the communication unit and sending the amplified signal to the electrode.

The example methods disclosed herein may be implemented in program instructions which are executable by various computing means and recorded in non-transitory computer-readable media. The non-transitory computer-readable media may include program instructions, data files, data structures, etc., separately or in combination. The program instructions recorded on the non-transitory computer-readable media may be designed and configured specially for the present disclosure, or may be well-known to people having ordinary skill in the art of computer software.

The method may also be implemented in program instructions and stored in the storage 150, and the program instructions may be temporarily stored in the RAM 113 of the controller 110 to be executed. The controller 110 may control hardware components of the electronic device 100 in accordance with the program instructions of the method, store in the storage 150 data temporarily or permanently generated during the execution of the method, and provide a UI required to perform the method to the touch screen controller 172.

In one example, a touch input of a user who wears an electronic device, e.g., a wearable device that generates an electric field, and a touch input of a user who does not wear such a device may be distinguished and handled separately, thereby providing diverse user experience in the electronic device.

In another example, a touch input of a hand that wears an electronic device, e.g., a wearable device that generates an electric field, and a touch input of a hand that does not wear such a device may be distinguished and handled separately, thereby providing diverse user experience in the electronic device.

In a further example, user inputs are distinguished by controlling the generation pattern of an electric field generated by the electronic device or the wearable device, thereby providing diverse user experience in the electronic device.

Therefore, a diverse user experience may be provided in the electronic device by controlling a generation pattern of an electric field generated by an electronic device (e.g., a wearable device) and distinguishing user inputs based on the generation pattern.

In addition, a diverse user experience may be provided in the electronic device by controlling a frequency of an electric field generated by an electronic device (e.g., a wearable device) and distinguishing user inputs based on the frequency.

Several examples have been described in connection with e.g., mobile communication terminals, but a person of ordinary skill in the art will understand and appreciate that various modifications can be made without departing the scope of the present disclosure. Thus, it will be apparent to those ordinary skilled in the art that the disclosure is not limited to the examples described, which have been provided only for illustrative purposes.

The above-described examples of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer or device accesses code for implementing the processing shown herein, the execution of the code transforms the general purpose computer or device into a special purpose computer or device for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method comprising:
communicatively coupling a first electronic device with a second electronic device;
transmitting, by the first electronic device to the second electronic device, information for distinguishing input types;
detecting, by the first electronic device, a signal from the second electronic device;
determining, by the first electronic device, whether the detected signal matches the transmitted information;
when the detected signal matches the transmitted information, receiving, by the first electronic device, a first touch or hover input that includes an electric field generated by the second electronic device and performing a first function corresponding to the first touch or hover input; and
when the detected signal does not match the transmitted information, receiving, by the first electronic device, a second touch or hover input that excludes the electric field generated by the second electronic device and performing a second function corresponding to the second touch or hover input.

2. The method of claim 1, wherein the information for distinguishing input types comprises a voltage level of the electric field generated by the second electronic device.

3. The method of claim 1, wherein the information for distinguishing input types comprises a pattern of the electric field generated by the second electronic device.

4. The method of claim 1, wherein the information for distinguishing input types comprises a frequency of the electric field generated by the second electronic device.

5. The method of claim 1, wherein determining whether the detected signal matches the transmitted information comprises:
detecting, by the first electronic device, a change in capacitance due to the second electronic device; and
identifying, by the first electronic device, that the detected signal matches the transmitted information, when the change in capacitance corresponds to the transmitted information.

6. The method of claim 1, wherein the information for distinguishing input types is changeable in real time.

7. The method of claim 1, further comprising operating, by the first electronic device, in an alternate mode, when receiving the first touch or hover input that includes an electric field generated by a second electronic device.

8. A method comprising:
detecting, by a first electronic device, an input;
setting, by the first electronic device, a first range and a second range for distinguishing input types;
identifying, by the first electronic device, a change in capacitance due to the input;
identifying, by the first electronic device, that the input is a first touch or hover input that includes an electric field generated by a second electronic device, when the change in capacitance corresponds to the first range; and
identifying, by the first electronic device, that the input is a second touch or hover input that excludes the electric field generated by the second electronic device, when the change in capacitance corresponds to the second range; and
wherein when the change in capacitance corresponds to the first range, performing a first function corresponding to the first touch or hover input; and
when the change in capacitance corresponds to the second range, performing a second function corresponding to the second touch or hover input.

9. The method of claim 8, wherein the first range is between a first threshold and a second threshold greater than the first threshold, the second range being greater than the second threshold.

10. The method of claim 8, further comprising operating, by the first electronic device, in an alternate mode, when the input is the first touch or hover input that includes an electric field generated by a second electronic device.

11. An electronic device comprising:
a touch screen;
a processor configured to set a first range and a second range for distinguishing input types on the touch screen; and
a touch screen controller configured to:
detect a change in capacitance at a point on the touch screen at a first operational frequency;

identify a first touch or hover input that includes an electric field generated by another electronic device, when the change in capacitance corresponds to the first range; and identify a second touch or hover input that excludes the electric field generated by the another electronic device, when the change in capacitance corresponds to the second range, wherein the processor is further configured to perform a first function corresponding to the first touch or hover input when the change in capacitance corresponds to the first range, and perform a second function corresponding to the second touch or hover input when the change in capacitance corresponds to the second range.

12. The electronic device of claim 11, wherein the first range is between a first threshold and a second threshold greater than the first threshold, the second range being greater than the second threshold.

13. The electronic device of claim 11, further comprising:
a controller to change a mode of the electronic device, when the touch or hover input includes the electric field generated by another electronic device.

14. The electronic device of claim 11, further comprising:
a communication unit to send associations between the ranges and the touch or hover inputs to the another electronic device.

15. A wearable device comprising:
a communication unit to receive settings from an electronic device for distinguishing input types;
a signal generator to generate a signal based on the settings; and
an electrode to detect bodily contact with the wearable device and produce an electric field from the signal generated by the signal generator,
wherein the electric field is at a first operational frequency that is different from a second operational frequency of a touch screen of the electronic device.

16. The wearable device of claim 15, wherein the settings comprise a threshold value for a change in capacitance detected from the touch screen of the electronic device.

17. The wearable device of claim 15, wherein the settings comprise a voltage level of the electric field produced by the electrode.

18. The wearable device of claim 15, wherein the settings comprise a generated pattern of the electric field produced by the electrode.

19. The wearable device of claim 15, wherein the settings comprise a frequency of the electric field produced by the electrode.

20. The wearable device of claim 15, wherein the wearable device comprises a watch like device.

21. The wearable device of claim 20, wherein the electrode is formed in a band of the watch like device.

22. The wearable device of claim 20, wherein the electrode is formed on a side of a main unit of the watch like device, the side to be in contact with a body part.

23. The wearable device of claim 15, further comprising
an amplifier to amplify a signal generated by the signal generator by a predetermined level based on information received through the communication unit, the amplifier further comprising a transmitted to send the amplified signal to the electrode.

* * * * *